US012462449B2

(12) United States Patent
Revanur et al.

(10) Patent No.: US 12,462,449 B2
(45) Date of Patent: Nov. 4, 2025

(54) MASK CONDITIONED IMAGE TRANSFORMATION BASED ON A TEXT PROMPT

(71) Applicant: Adobe Inc., San Jose, CA (US)

(72) Inventors: Ambareesh Revanur, San Jose, CA (US); Debraj Debashish Basu, Sunnvyale, CA (US); Shradha Agrawal, Milpitas, CA (US); Dhwanit Agarwal, San Jose, CA (US); Deepak Pai, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 245 days.

(21) Appl. No.: 18/319,808

(22) Filed: May 18, 2023

(65) Prior Publication Data

US 2024/0386627 A1    Nov. 21, 2024

(51) Int. Cl.
| | |
|---|---|
| *G06F 40/40* | (2020.01) |
| *G06T 7/11* | (2017.01) |
| *G06T 11/00* | (2006.01) |
| *G06V 10/774* | (2022.01) |
| *G06V 10/82* | (2022.01) |
| *G06V 20/70* | (2022.01) |

(52) U.S. Cl.
CPC ............ *G06T 11/001* (2013.01); *G06F 40/40* (2020.01); *G06T 7/11* (2017.01); *G06V 10/774* (2022.01); *G06V 10/82* (2022.01); *G06V 20/70* (2022.01); *G06T 2207/20081* (2013.01); *G06T 2207/20084* (2013.01)

(58) Field of Classification Search
CPC ............... G06T 11/001; G06T 7/11; G06T 2207/20081; G06T 2207/20084; G06T 11/60; G06F 40/40; G06V 10/774; G06V 10/82; G06V 20/70
See application file for complete search history.

(56) References Cited

U.S. PATENT DOCUMENTS

2020/0242774 A1* 7/2020 Park ................... G06N 3/084
2021/0383584 A1* 12/2021 Zhang ................. G06T 3/40
2024/0169622 A1* 5/2024 Xie ..................... G06T 11/00

OTHER PUBLICATIONS

Morita, Ryugo, et al. "Interactive Image Manipulation with Complex Text Instructions." arXiv preprint arXiv:2211.15352 (2022). (Year: 2022).*
Couairon, G., Verbeek, J., Schwenk, H., & Cord, M. (2022). Diffedit: Diffusion-based semantic image editing with mask guidance. arXiv preprint arXiv:2210.11427. (Year: 2022).*

(Continued)

*Primary Examiner* — Daniel F Hajnik
*Assistant Examiner* — Adeel Bashir
(74) *Attorney, Agent, or Firm* — FIG. 1 Patents

(57) ABSTRACT

In accordance with the described techniques, an image transformation system receives an input image and a text prompt, and leverages a generator network to edit the input image based on the text prompt. The generator network includes a plurality of layers configured to perform respective edits. A plurality of masks are generated based on the text prompt that define local edit regions, respectively, of the input image for respective layers of the generator network. Further, the generator network generates an edited image by editing the input image based on the plurality of masks, the respective edits of the respective layers, and the text prompt.

20 Claims, 8 Drawing Sheets

(56) References Cited

OTHER PUBLICATIONS

Li, B., Qi, X., Lukasiewicz, T., & Torr, P. H. (2020). Manigan: Text-guided image manipulation. In Proceedings of the IEEE/CVF conference on computer vision and pattern recognition (pp. 7880-7889). (Year: 2020).*
Avrahami, O., Lischinski, D., & Fried, O. (2022). Blended diffusion for text-driven editing of natural images. In Proceedings of the IEEE/CVF conference on computer vision and pattern recognition (pp. 18208-18218). (Year: 2022).*
Xie, S., Zhang, Z., Lin, Z., Hinz, T., & Zhang, K. (2023). Smartbrush: Text and shape guided object inpainting with diffusion model. In Proceedings of the IEEE/CVF conference on computer vision and pattern recognition (pp. 22428-22437). (Year: 2023).*
Watanabe, Y., Togo, R., Maeda, K., Ogawa, T., & Haseyama, M. (2023). Text-guided image manipulation via generative adversarial network with referring image segmentation-based guidance. IEEE Access, 11, 42534-42545. (Year: 2023).*
Abdal, Rameen, "CLIP2StyleGAN: Unsupervised Extraction of StyleGAN Edit Directions", Cornell University arXiv, arXiv.org [retrieved Feb. 20, 2023]. Retrieved from the Internet <https://arxiv.org/pdf/2112.05219.pdf>., Dec. 9, 2021, 17 Pages.
Abdal, Rameen et al., "Image2StyleGAN: How to Embed Images Into the StyleGAN Latent Space?", 2019 IEEE/CVF International Conference on Computer Vision (ICCV) [retrieved Feb. 20, 2023]. Retrieved from the Internet <https://arxiv.org/pdf/1904.03189.pdf>., Sep. 3, 2019, 23 pages.
Abdal, Rameen et al., "Styleflow: Attribute-conditioned exploration of stylegan-generated images using conditional continuous normalizing flows", ACM Transactions on Graphics, vol. 40, No. 3 [retrieved Feb. 20, 2023]. Retrieved from the Internet <https://arxiv.org/pdf/2008.02401.pdf>., May 5, 2021, 22 Pages.
Alaluf, Yuval et al., "HyperStyle: StyleGAN Inversion with HyperNetworks for Real Image Editing", Cornell University arXiv, arXiv.org [retrieved Feb. 20, 2023]. Retrieved from the Internet <https://arxiv.org/pdf/2111.15666.pdf>., Mar. 29, 2022, 27 Pages.
Alaluf, Yuval et al., "Only a Matter of Style: Age Transformation Using a Style-Based Regression Model", Cornell University arXiv, arXiv.org [retrieved Feb. 20, 2023]. Retrieved from the Internet <https://arxiv.org/pdf/2102.02754.pdf>., May 18, 2021, 21 Pages.
Alaluf, Yuval et al., "Third Time's the Charm? Image and Video Editing with StyleGAN3", Advances in Image Manipulation Workshop—ECCV 2022 [retrieved Feb. 20, 2023]. Retrieved from the Internet <https://yuval-alaluf.github.io/stylegan3-editing/>., 6 Pages.
Avrahami, Omri et al., "Blended Diffusion for Text-driven Editing of Natural Images", Cornell University arXiv, arXiv.org [retrieved Feb. 20, 2023]. Retrieved from the Internet <https://arxiv.org/pdf/2111.14818.pdf>., Nov. 2021, 32 Pages.
Bermano, Amit, "State-of-the-art in the architecture, methods and applications of stylegan", Cornell University arXiv, arXiv.org [retrieved Feb. 20, 2023]. Retrieved from the Internet <https://arxiv.org/pdf/2202.14020.pdf>., Feb. 28, 2022, 19 Pages.
Brock, Andrew et al., "Large Scale Gan Training for High Fidelity Natural Image Synthesis", Cornell University arXiv, arXiv.org [retrieved Feb. 20, 2023]. Retrieved from the Internet <https://arxiv.org/pdf/1809.11096.pdf>., Feb. 25, 2019, 35 pages.
Collins, Edo et al., "Editing in Style: Uncovering the Local Semantics of GANs", Cornell University arXiv, arXiv.org [retrieved Aug. 9, 2023]. Retrieved from the Internet <https://arxiv.org/pdf/2004.14367.pdf>., May 21, 2020, 23 Pages.
Deng, Jiankang et al., "ArcFace: Additive Angular Margin Loss for Deep Face Recognition", Cornell University arXiv, arXiv.org [retrieved Feb. 20, 2023]. Retrieved from the Internet <https://arxiv.org/pdf/1801.07698.pdf>., Feb. 2019, 11 pages.
Dong, Hao, "Semantic Image Synthesis via Adversarial Learning", Cornell University arXiv, arXiv.org [retrieved Feb. 20, 2023]. Retrieved from the Internet <https://arxiv.org/pdf/1707.06873.pdf>., Jul. 21, 2017, 9 Pages.
Gal, Rinon et al., "StyleGAN-NADA: CLIP-Guided Domain Adaptation of Image Generators", Cornell University arXiv, arXiv.org [retrieved Feb. 20, 2023]. Retrieved from the Internet <https://arxiv.org/pdf/2108.00946.pdf>., Dec. 16, 2021, 25 Pages.
Goodfellow, Ian J. et al., "Generative Adversarial Nets", In: Advances in neural information processing systems (2014) [retrieved Feb. 21, 2023]. Retrieved from the Internet <https://www.cs.utah.edu/~zhe/teach/archived/2019f/6190-pdf/gans.pdf>., Jun. 10, 2014, 9 pages.
Härkönen, Erik et al., "GANSpace: Discovering Interpretable GAN Controls", Cornell University arXiv, arXiv.org [retrieved Feb. 20, 2023]. Retrieved from the Internet <https://arxiv.org/pdf/2004.02546.pdf>., Dec. 14, 2020, 29 Pages.
Hou, Xianxu et al., "FEAT: Face Editing with Attention", Cornell University arXiv, arXiv.org [retrieved Jun. 14, 2023]. Retrieved from the Internet <https://arxiv.org/pdf/2202.02713.pdf>., Feb. 6, 2022, 14 Pages.
Hyun Lee, Seung, "Sound-Guided Semantic Image Manipulation", Cornell University arXiv, arXiv.org [retrieved Feb. 20, 2023]. Retrieved from the Internet <https://arxiv.org/pdf/2112.00007.pdf>., Nov. 30, 2021, 11 Pages.
Kafri, Omer et al., "StyleFusion: Disentangling Spatial Segments in StyleGAN-Generated Images", ACM Transactions on Graphics, vol. 41, No. 5 [retrieved Feb. 20, 2023]. Retrieved from the Internet <https://arxiv.org/pdf/2107.07437v1.pdf>., Oct. 26, 2022, 31 Pages.
Karras, Tero et al., "A Style-Based Generator Architecture for Generative Adversarial Networks", Cornell University arXiv, arXiv.org [retrieved Jun. 28, 2023]. Retrieved from the Internet <https://arxiv.org/pdf/1812.04948.pdf>., Mar. 29, 2019, 12 pages.
Karras, Tero et al., "Analyzing and Improving the Image Quality of StyleGAN", Cornell University arXiv, arXiv.org [retrieved Feb. 20, 2023]. retrieved from the Internet <https://arxiv.org/pdf/1912.04958.pdf>., Dec. 2019, 21 Pages.
Karras, Tero et al., "Progressive Growing of GANs for Improved Quality, Stability, and Variation", Cornell University arXiv, arXiv.org [retrived Feb. 20, 2023]. Retrieved from the Internet <https://arxiv.org/pdf/1710.10196.pdf>., Feb. 26, 2018, 26 Pages.
Kim, Hyunsu et al., "Exploiting Spatial Dimensions of Latent in GAN for Real-Time Image Editing", Cornell University arXiv, arXiv.org [retrieved Aug. 9, 2023]. Retrieved from the Internet <https://arxiv.org/pdf/2104.14754.pdf>., Jun. 23, 2021, 25 Pages.
Kingma, Diederik P. et al., "Adam: A Method for Stochastic Optimization", Cornell University, arXiv Preprint, arXiv.org [retrieved Aug. 9, 2023]. Retrieved from the Internet <https://arxiv.org/pdf/1412.6980.pdf>., Jan. 30, 2017, 15 pages.
Kocasari, Umut et al., "StyleMC: Multi-Channel Based Fast Text-Guided Image Generation and Manipulation", Cornell University arXiv, arXiv.org [retrieved Feb. 20, 2023]. Retrieved from the Internet <https://arxiv.org/pdf/2112.08493.pdf>., Jan. 2022, 14 Pages.
Krause, Jonathan et al., "3D Object Representations for Fine-Grained Categorization", 4th IEEE Workshop on 3D Representation and Recognition, at ICCV 2013 (3dRR-13) [retrieved Feb. 20, 2023]. Retrieved from the Internet <http://vision.stanford.edu/pdf/3drr13.pdf>., Dec. 8, 2013, 8 pages.
Li, Bowen et al., "ManiGAN: Text-Guided Image Manipulation", Cornell University arXiv, arXiv.org [retrieved Feb. 20, 2023]. Retrieved from the Internet <https://arxiv.org/pdf/1912.06203.pdf>., Mar. 30, 2020, 16 Pages.
Ling, Huan et al., "EditGAN: High-Precision Semantic Image Editing", Cornell University arXiv, arXiv.org [retrieved Aug. 9, 2023]. Retrieved from the Internet <https://arxiv.org/pdf/2111.03186.pdf>., Nov. 4, 2021, 38 Pages.
Liu, Yahui et al., "Describe What to Change: A Text-guided Unsupervised Image-to-Image Translation Approach", Cornell University arXiv, arXiv.org [retrieved Feb. 20, 2023]. Retrieved from the Internet <https://arxiv.org/pdf/2008.04200.pdf>., Aug. 10, 2020, 20 Pages.
Nair, Vinod et al., "Rectified Linear Units Improve Restricted Boltzmann Machines", In Proceedings of the 27th International Conference on Machine Learning (ICML-10) [retrieved Mar. 16, 2023]. Retrieved from the Internet <http://www.csri.utoronto.ca/~hinton/absps/reluICML.pdf>., Jun. 21, 2010, 8 pages.
Nam, Seonghyeon et al., "Text-Adaptive Generative Adversarial Networks: Manipulating Images with Natural Language", Cornell

(56) References Cited

OTHER PUBLICATIONS

University arXiv, arXiv.org [retrieved Feb. 20, 2023]. Retrieved from the Internet <https://arxiv.org/pdf/1810.11919.pdf>., Nov. 28, 2018, 10 Pages.
Nichol, Alex et al., "Glide: Towards photorealistic image generation and editing with text-guided diffusion models", Cornell University arXiv, arXiv.org [retrieved Feb. 20, 2023]. Retrieved from the Internet <https://arxiv.org/pdf/2112.10741.pdf>., Mar. 8, 2022, 20 Pages.
Nie, Weili et al., "Semi-Supervised StyleGAN for Disentanglement Learning", Cornell University arXiv, arXiv.org [retrieved Feb. 20, 2023]. Retrieved from the Internet <https://authors.library.caltech.edu/102273/2/2003.03461.pdf>., Apr. 28, 2020, 21 Pages.
Pakhomov, Daniil et al., "Segmentation in Style: Unsupervised Semantic Image Segmentation with Stylegan and CLIP", Cornell University arXiv, arXiv.org [retrieved Feb. 20, 2023]. Retrieved from the Internet <https://arxiv.org/pdf/2107.12518.pdf>., Nov. 18, 2021, 9 Pages.
Parmar, Gaurav et al., "On Aliased Resizing and Surprising Subtleties in GAN Evaluation", Cornell University arXiv, arXiv.org [retrieved Feb. 20, 2023]. Retrieved from the Internet <https://arxiv.org/pdf/2104.11222.pdf>., Jan. 21, 2022, 15 Pages.
Parmar, Gaurav et al., "Spatially-Adaptive Multilayer Selection for GAN Inversion and Editing", Cornell University arXiv, arXiv.org [retrieved Feb. 20, 2023]. Retrieved from the Internet <https://arxiv.org/pdf/2206.08357.pdf>., Jun. 2022, 18 Pages.
Patashnik, OR et al., "StyleCLIP: Text-Driven Manipulation of StyleGAN Imagery", Cornell University arXiv, arXiv.org [retrieved Feb. 20, 2023]. Retrieved from the Internet <https://arxiv.org/pdf/2103.17249.pdf>., Mar. 31, 2021, 18 Pages.
Pinkney, Justin et al., "clip2latent: Text driven sampling of a pre-trained StyleGAN using denoising diffusion and CLIP", Cornell University arXiv, arXiv.org [retrieved Feb. 20, 2023]. Retrieved from the Internet <https://arxiv.org/pdf/2210.02347.pdf>., Oct. 5, 2022, 16 Pages.
Radford, Alec et al., "Learning Transferable Visual Models From Natural Language Supervision", Cornell University arXiv, arXiv.org [retrieved Jun. 29, 2023]. Retrieved from the Internet <https://arxiv.org/pdf/2103.00020.pdf>., Feb. 26, 2021, 48 Pages.
Ramesh, Aditya et al., "Hierarchical Text-Conditional Image Generation with CLIP Latents", Cornell University arXiv, arXiv.org [retrieved Feb. 28, 2023]. Retrieved from the Internet <https://arxiv.org/pdf/2204.06125.pdf>., Apr. 13, 2022, 27 Pages.
Ramesh, Aditya et al., "Zero-Shot Text-to-Image Generation", Cornell University arXiv, arXiv.org [retrieved Feb. 21, 2023]. Retrieved from the Internet <https://arxiv.org/pdf/2102.12092.pdf>., Feb. 26, 2021, 20 Pages.
Reed, Scott et al., "Generative Adversarial Text to Image Synthesis", Cornell University arXiv, arXiv.org [retrieved Feb. 20, 2023]. Retrieved from the Internet <https://arxiv.org/pdf/1605.05396.pdf>., Jun. 5, 2016, 10 pages.
Richardson, Elad et al., "Encoding in Style: A StyleGAN Encoder for Image-to-Image Translation", Cornell University arXiv, arXiv.org [retrieved Feb. 20, 2023]. Retrieved from the Internet <https://arxiv.org/pdf/2008.00951.pdf>., Aug. 2020, 21 Pages.
Shen, Yujun, "Closed-Form Factorization of Latent Semantics in GANs", Cornell University arXiv, arXiv.org [retrieved Feb. 20, 2023]. Retrieved from the Internet <https://arxiv.org/pdf/2007.06600.pdf>., Apr. 3, 2021, 9 Pages.
Shen, Yujun et al., "Interpreting the Latent Space of GANs for Semantic Face Editing", Cornell University arXiv, arXiv.org [retrieved Feb. 20, 2023]. Retrieved from the Internet <https://arxiv.org/pdf/1907.10786.pdf>., Nov. 26, 2019, 20 pages.
Tewari, Ayush et al., "StyleRig: Rigging StyleGAN for 3D Control Over Portrait Images", Cornell University arXiv, arXiv.org [retrieved Feb. 20, 2023]. Retrieved from the Internet <https://arxiv.org/pdf/2004.00121.pdf>., Jun. 13, 2020, 13 Pages.
Wang, Zhou et al., "Multiscale structural similarity for image quality assessment", The Thrity-Seventh Asilomar Conference on Signals, Systems & Computers [retrieved Feb. 20, 2023]. Retrieved from the Internet <http://compression.ru/video/quality_measure/msssim.pdf>., Dec. 2003, 6 pages.
Wu, Zongze et al., "StyleSpace Analysis: Disentangled Controls for StyleGAN Image Generation", Cornell University arXiv, arXiv.org [retrieved Feb. 21, 2023]. Retrieved from the Internet <https://arxiv.org/pdf/2011.12799.pdf>., Dec. 3, 2020, 25 Pages.
Xia, Weihao et al., "TediGAN: Text-Guided Diverse Face Image Generation and Manipulation", Cornell University arXiv, arXiv.org [retrieved Feb. 20, 2023]. Retrieved from the Internet <https://arxiv.org/pdf/2012.03308.pdf>., Mar. 29, 2021, 10 Pages.
Xu, Bing et al., "Empirical Evaluation of Rectified Activations in Convolutional Network", Cornell University arXiv, arXiv.org [retrieved Feb. 20, 2023]. Retrieved from the Internet <https://arxiv.org/pdf/1505.00853.pdf>., Nov. 27, 2015, 5 Pages.
Xu, Tao et al., "AttnGAN: Fine-Grained Text to Image Generation with Attentional Generative Adversarial Networks", Cornell University arXiv, arXiv.org [retrieved Feb. 21, 2023]. Retrieved from the Internet <https://arxiv.org/pdf/1711.10485.pdf>., Nov. 28, 2017, 9 pages.
Zhang, Han et al., "StackGAN: Text to Photo-realistic Image Synthesis with Stacked Generative Adversarial Networks", Cornell University arXiv, arXiv.org [retrieved Feb. 20, 2023]. Retrieved from the Internet <https://arxiv.org/pdf/1612.03242.pdf>., Aug. 5, 2017, 14 pages.
Zhang, Han, "StackGan++: Realistic Image Synthesis with Stacked Generative Adversarial Networks", Cornell University arXiv, arXiv.org [retrieved Feb. 20, 2023]. Retrieved from the Internet <https://arxiv.org/pdf/1710.10916.pdf>., Oct. 19, 2017, 15 pages.
Zhang, Richard et al., "The Unreasonable Effectiveness of Deep Features as a Perceptual Metric", Cornell University arXiv, arXiv.org [retrieved Mar. 9, 2023]. Retrieved from the Internet <https://arxiv.org/pdf/1801.03924.pdf>., Apr. 10, 2018, 14 Pages.
Zhang, Yuxuan et al., "DatasetGAN: Efficient Labeled Data Factory with Minimal Human Effort", Cornell University arXiv, arXiv.org [retrieved Feb. 20, 2023]. Retrieved from the Internet <https://arxiv.org/pdf/2104.06490.pdf>., Apr. 20, 2021, 11 Pages.
Zhou, Yufan et al., "TiGAN: Text-Based Interactive Image Generation and Manipulation", AAAI Technical Track on Computer Vision III, vol. 36 No. 3 [retrieved Feb. 20, 2023]. Retrieved from the Internet <https://ojs.aaai.org/index.php/AAAI/article/view/20270>., Jun. 28, 2022, 9 Pages.

* cited by examiner

MASK CONDITIONED IMAGE TRANSFORMATION BASED ON A TEXT PROMPT

BACKGROUND

Image editing applications often include functionality for transforming a digital image in accordance with a text prompt. For instance, an image editing application that implements this functionality is typically tasked with automatically modifying a digital image to include or enhance a target attribute identified by a user-provided text prompt. As an example of this functionality, an image editing application user provides a digital image depicting a car and a text prompt "spoiler," and in response, the image editing application aims to add a spoiler to the car depicted in the digital image.

SUMMARY

Techniques for mask conditioned image transformation based on a text prompt are described herein. In an example, a computing device implements an image transformation system to receive an input image and a text prompt. The image transformation system includes a generator network that includes a plurality of layers each controlling a different set of attributes in the input image. More specifically, each respective layer is configured to perform respective edits to the set of attributes in the input image that the respective layer controls.

In one or more implementations, the input image is defined by a latent vector. Further, the image transformation determines a latent edit vector for each layer of the generator network. A respective latent edit vector represents a degree of change to apply to the input image at a corresponding layer of the generator network in order to generate an edited image that is modified in accordance with the text prompt. Further, a combined latent vector is generated for each layer of the generator network by combining the latent edit vectors with the latent vector. Each layer of the generator network outputs an unedited feature based on the latent vector. The unedited feature is a representation of the input image that includes the set of attributes that the respective layer controls. Each layer of the generator network also outputs an edited feature based on a corresponding combined latent vector. The edited feature is a representation of the input image having the set of attributes controlled by the respective layer modified based on the text prompt.

Moreover, the system generates a plurality of masks, one for each layer of the generator network. The mask generated for a respective layer identifies a local edit region where the set of attributes of the respective layer are affected based on the text prompt. The image transformation system then computes a blended feature for each layer of the generator network by blending the unedited feature and the edited feature based on the mask. The blended feature computed for a respective layer includes the edited feature of the respective layer in the local edit region and the unedited feature of the respective layer outside local edit region. The image transformation system then generates the edited image by incorporating the blended features computed for each layer into the edited image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
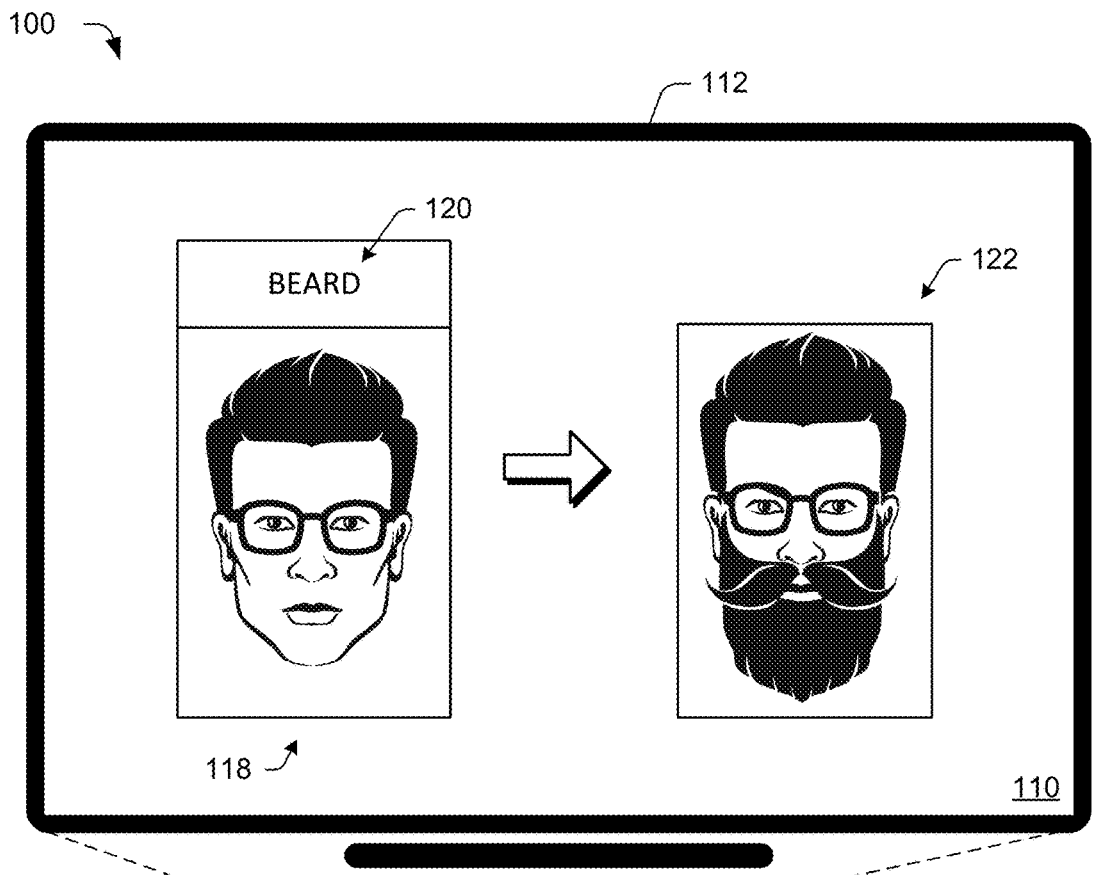
FIG. 1 is an illustration of an environment in an example implementation that is operable to employ techniques described herein for mask conditioned image transformation based on a text prompt.
Figure 1:
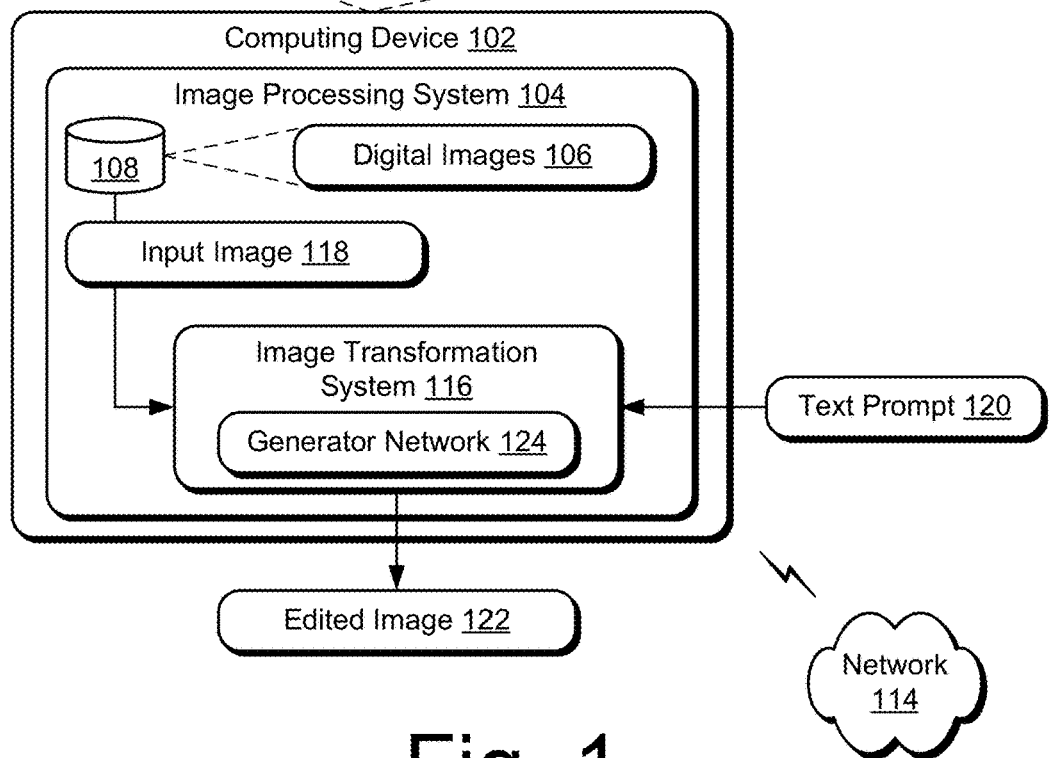

Image processing systems are often implemented for text-based image transformation tasks, which involve transforming an input image in accordance with a text prompt. Techniques for text-based image transformation often implement a generative adversarial network (GAN) that typically includes a generator network having a number of layers each controlling a different set of attributes in the input image. In terms of text-based image transformation, each respective layer is responsible for modifying the set of attributes controlled by the respective layer based on the text prompt. Conventional text-based image transformation techniques rely on user input to manually select a single layer of a generator network to edit an input image. These conventional techniques thus rely on user knowledge of the internal structure of the generator network, including which layers affect which attributes, to accurately predict which layer to modify the input image in accordance with a text prompt. If an incorrect layer is selected, these conventional techniques produce undesirable artifacts in a resulting transformed image. Further, even when a correct layer is selected, conventional techniques often omit edits for text prompts that invoke changes at multiple layers of the generator network.

To overcome the limitations of conventional techniques, techniques for mask conditioned image transformation based on a text prompt are described herein. In accordance with the described techniques, an image transformation system includes a mapping network and a generator network having a number of convolutional layers. Broadly, each respective layer of the generator network is configured to output an unedited feature representing the input image and including the set of attributes that the respective layer controls. Further, each respective layer of the generator network is configured to perform respective edits to the set of attributes controlled by the respective layer. In doing so, each respective layer outputs an edited feature representing the input image and having the set of attributes modified based on the text prompt. The unedited feature and the edited feature are blended at each respective layer based on a layer-specific mask generated by the image transformation system. Finally, an edited image is generated that incorporates the blended features computed for each layer.

In the following example, the image transformation system receives an input image depicting a human subject, and a text prompt "beard." The input image is defined by a latent vector, which is received by the mapping network. Further, the mapping network transforms the latent vector to produce a transformed latent vector. The transformed latent vector is further transformed by a layer specific affine operation at each layer of the generator network to produce a different latent style vector for each layer of the generator network.

Each respective layer of the generator network receives, as input, a latent style vector corresponding to the respective layer and a blended feature as output from the previous layer of the generator network. Since there is no previous blended feature for the first layer of the generator network, the first layer receives a constant feature rather than the previous blended feature. Further, each respective layer outputs an unedited feature, which incorporates the blended features output from previous layers, and adds the set of attributes that the respective layer controls. In an illustrative example in which a respective layer controls the attribute of color, the unedited feature incorporates the blended features output by previous layers, and adds the color of the input image.

In accordance with the described techniques, the image transformation system determines a latent edit vector for each layer of the generator network based on the text prompt. Generally, a latent edit vector represents a degree of change to apply to the transformed latent vector to produce a combined latent vector, such that the combined latent vector is usable by a corresponding layer of the generator network to output an edited feature that is modified in accordance with the text prompt.

In one or more implementations, a global direction module is leveraged to determine the latent edit vectors conditioned on the text prompt. During training, the latent edit vectors determined by the global direction module are learned through a machine learning process. Notably, the latent edit vectors as determined by the global direction module are input image independent, meaning that the latent edit vectors determined for a particular text prompt are usable to edit any input image in accordance with the particular text prompt.

Additionally or alternatively, a latent mapper module is leveraged to determine the latent edit vectors. The latent mapper module includes a first machine learning mapper model configured to determine latent edit vectors for a first group of layers, a second machine learning mapper model configured to determine latent edit vectors for a second group of layers, and a third machine learning mapper model configured to determine latent edit vectors for a third group of layers. Notably, the first group of layers are responsible for controlling low resolution attributes in the input image (e.g., position), the second group of layers are responsible for controlling intermediate resolution attributes in the input image (e.g., structure), and the third group of layers are responsible for controlling high resolution attributes in the input image, e.g., appearance. To determine the latent edit vectors, the machine learning mapper models are conditioned on the transformed latent vector and the text prompt. More specifically, each respective machine learning mapper model individually processes the transformed latent vector together with the text prompt for each layer within a respective group of layers that is assigned to the respective machine learning mapper model. In contrast to the latent edit vectors determined by the global direction module, the latent edit vectors determined by the latent mapper module are input image dependent. This means that the latent edit vectors determined for a particular text prompt are different as applied to different input images. During training, parameters of the machine learning mapper models are learned through a machine learning process.

In accordance with the described techniques, the latent edit vectors are combined with the transformed latent vector to produce combined latent vectors. The combined latent vectors are further transformed by the layer specific affine operations to produce edited latent style vectors—one for each layer of the generator network. Given this, each respective layer of the generator network receives, as input, an edited latent style vector corresponding to the respective layer and a blended feature as output from the previous layer of the generator network. Further, each respective layer outputs an edited feature, which incorporates the blended features output from previous layers, and includes edits based on the text prompt to the set of attributes controlled by the respective layer. In an illustrative example in which a particular layer controls the attribute of color, the edited feature incorporates the blended features output by previous layers, and modifies the color of the input image to include a beard on the human subject.

Moreover, a mask is generated for each respective layer of the generator network that indicates a local edit region where the set of attributes of the respective layer are affected based on the text prompt. Consider the previous example in which a particular layer controls the attribute of color. Since the color of the beard region is affected by the text prompt "beard," the mask generated for the particular layer identifies, as the local edit region, a portion of the input image including the chin, cheeks, and neck of the human subject.

In one or more implementations, a segment selection module is employed to generate the masks. To do so, a pre-trained segmentation network is leveraged to partition the input image into semantic segments that each identify a different portion of the human subject. The semantic segments are provided to a matrix computation module, which computes a matrix indicating which ones of the semantic segments are selected for transformation in accordance with the text prompt for each layer of the generator network. For example, the matrix includes columns that represent different layers of the generator network, rows that represent different semantic segments, and entries populated with confidence values indicating degrees of likelihood that respective layers affect corresponding semantic segments based on the text prompt. Moreover, a mask generation module converts each respective column in the matrix to a mask that identifies, as the local edit region, the semantic segments in the respective column having confidence values that exceed a threshold. During training, the confidence values of the matrix are learned through a machine learning process.

Additionally or alternatively, a convolutional attention network is employed to generate the masks. The convolutional attention network includes a convolutional neural network (CNN) for each layer of the generator network. Each of the CNNs receive, as input, the unedited feature output by a corresponding layer and the text prompt. Further, each of the CNNs output a mask for the corresponding layer. During training, parameters of the CNNs are learned through a machine learning process.

In accordance with the described techniques, a blended feature is computed for each layer of the generator network based on the unedited feature, the edited feature, and the mask. In particular, the blended feature computed for a respective layer includes the edited feature in the local edit region, and the unedited feature outside the local edit region. By blending the features in this way, the image transformation system ensures that the blended feature is solely edited in the local edit region that is affected by the text prompt.

In various scenarios, a particular layer does not affect the input image, thereby causing the image transformation system to produce a zero mask for the particular layer, e.g., the zero mask does not identify a local edit region. In such scenarios, the blended feature output at the particular layer is the unedited feature. Since the unedited feature incorporates the blended features received from previous layers, so too does the blended feature. Therefore, generating the unedited feature and the edited feature conditioned on the previous blended feature ensures that edits made at previous layers of the generator network are propagated to subsequent layers of the generator network. This is true even when a zero mask is utilized for the feature blending.

Once computed, the blended feature of a respective layer is fed forward to a subsequent layer of the generator network. This process is then repeated for each layer of the generator network. Furthermore, a blended feature generated for a final layer of the generator network is rendered in a color space to generate the edited image. In the described example, the edited image depicts the human subject of the input image, as edited to include a beard.

Since the mask-conditioned feature blending is performed at each layer of the generator network, the described techniques automatically select which layers of the generator network are to be utilized to transform the input image in accordance with the text prompt. By way of example, the layers for which a zero mask is produced are layers that are not selected to transform the input image. In contrast, the layers for which a local edit region is identified in the mask are layers that are selected to transform the input image. Therefore, the described techniques support improved user interaction with the image transformation system as compared to conventional techniques because the described image transformation system eliminates manual selection of an appropriate layer to carry out an edit. By doing so, the image transformation system is accessible by a user to accurately transform an input image in accordance with a text prompt without knowledge of which layers of the generator network affect which attributes. Moreover, the described techniques improve adherence of the edited image to the text prompt over conventional techniques. This improvement is achieved because, in scenarios in which a text prompt invokes changes at multiple layers of the generator network, the image transformation system automatically invokes multiple layers to carry out a corresponding edit.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein for mask conditioned image transformation based on a text prompt. The illustrated environment 100 includes a computing device 102, which is configurable in a variety of ways. The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 9.

The computing device 102 is illustrated as including an image processing system 104. The image processing system 104 is implemented at least partially in hardware of the computing device 102 to process and transform digital images 106, which are illustrated as maintained in storage 108 of the computing device 102. Such processing includes creation of the digital images 106, modification of the digital images 106, and rendering of the digital images 106 in a user interface 110 for output, e.g., by a display device 112. Although illustrated as implemented locally at the computing device 102, functionality of the image processing system 104 is also configurable as whole or part via functionality available via the network 114, such as part of a web service or "in the cloud."

An example of functionality incorporated by the image processing system 104 to process the digital images 106 is illustrated as an image transformation system 116. In general, the image transformation system 116 is configured to receive an input image 118 and a text prompt 120, and generate an edited image 122 by editing the input image 118 in accordance with the text prompt 120. As shown in the illustrated example, for instance, the image transformation system 116 receives an input image 118 depicting a human subject and a text prompt 120 "beard," and outputs an edited image 122 depicting the human subject with a beard.

In accordance with the described techniques, the input image 118 is defined by a transformed latent vector, which is received by a generator network 124. Broadly, the generator network 124 includes a plurality of layers (e.g., convolutional layers) that each control a different set of attributes of the input image 118. The transformed latent vector is further transformed by layer specific affine operations at each layer of the generator network 124 to produce latent style vectors. Furthermore, each layer of the generator network 124 receives a corresponding latent style vector, and generates an unedited feature based on the latent style vector. The unedited feature output by a respective layer of the generator network 124 is a representation of the input image 118 that includes the set of attributes that the respective layer controls. In one example in which a layer of the generator network 124 controls color, the unedited feature output by the layer is a representation of the input image 118 that includes color.

Generally, respective layers of the generator network are configured to perform edits to respective sets of attributes controlled by the respective layers. To do so, the image transformation system 116 determines latent edit vectors to apply to the transformed latent vector based on the text prompt 120—one latent edit vector for each layer of the generator network 124. The transformed latent vector and the latent edit vectors are combined to produce a combined latent vector for each layer of the generator network. The combined latent vectors are also transformed by layer specific affine operations at corresponding layers of the generator network 124 to produce edited latent style vectors. Each layer of the generator network 124 receives a corresponding edited latent style vector and outputs an edited feature based on the edited latent style vector. The edited feature output by a respective layer is a representation of the input image 118 that includes the set of attributes of the input image 118 that the respective layer controls, such that the set of attributes are modified in accordance with the text prompt 120. Continuing with the previous example in which a layer of the generator network 124 controls color and the text prompt 120 is "beard," the edited feature is a representation of the input image 118 having the color of the beard region modified.

In accordance with the described techniques, the image transformation system 116 generates a mask for each layer of the generator network 124. The mask generated for a respective layer of the generator network 124 indicates a local edit region that is to be modified by the respective layer based on the text prompt 120. Consider the previous example in which the text prompt 120 is "beard" and a layer of the generator network 124 controls color. In this example, the mask generated for the layer identifies, as the local edit region, a region of the human subject's face that includes the chin, the cheeks, and the neck.

Furthermore, a blended feature is computed for each layer of the generator network 124 based on the unedited feature, the edited feature, and the mask. For example, the blended feature includes the unedited feature in a portion of the input image 118 outside the local edit region, and the edited feature in a portion of the input image 118 within the local edit region. The edited image 122 is generated by incorporating the blended features computed for each layer of the generator network 124 into the edited image 122.

Conventional techniques for text prompt-based image transformation rely on user input to manually select a single layer of a generator network to edit an input image. Therefore, conventional techniques rely on user knowledge of the internal structure of the generator network, including which layers affect which attributes, to accurately predict which layer to modify the input image in accordance with a text prompt. If an incorrect layer is selected, these conventional techniques produce undesirable artifacts in a resulting edited image. Further, even when a correct layer is selected, these conventional techniques often omit edits for text prompts that invoke changes at multiple layers of the generator network.

The described techniques improve user interaction with the image transformation system 116. This improvement is achieved by the image transformation system 116 generating a mask for each layer of the generator network 124, and by performing feature blending at each layer of the generator network 124. By doing so, the image transformation system 116 automatically selects one or more layers of the generator network 124 to carry out an edit based on the text prompt 120. Furthermore, the image transformation system 116 automatically selects multiple layers to carry out an edit in various implementations. As a result, the image transformation system 116 outputs an edited image 122 having fewer omitted edits than conventional techniques when the text prompt 120 invokes edits at multiple layers of the generator network 124.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Image Transformation Features

Figure 2:
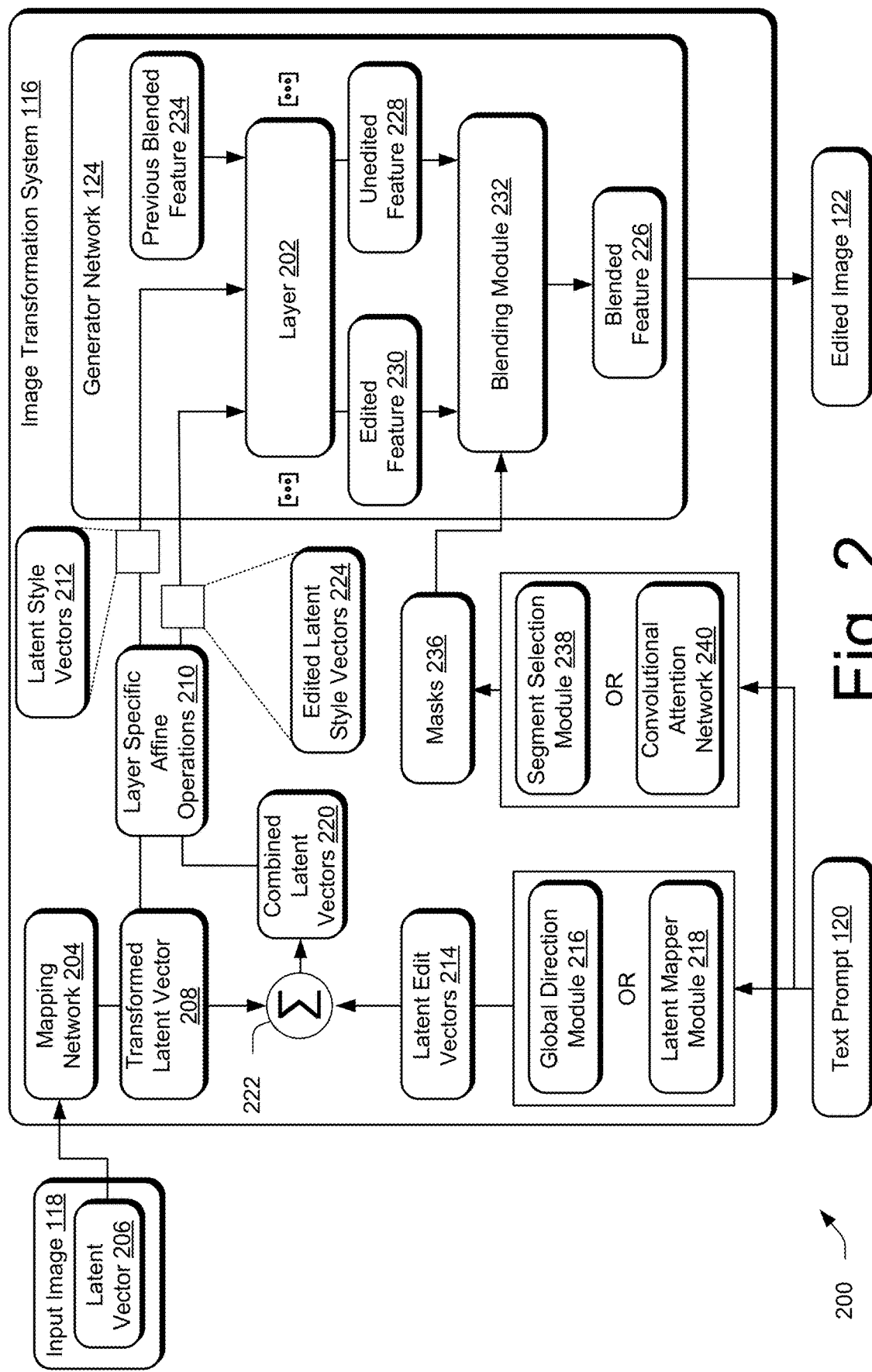
FIG. 2 depicts a system in an example implementation showing operation of an image transformation system employing a generator network to generate an edited image.

FIG. 2 depicts a system 200 in an example implementation showing operation of an image transformation system 116 employing a generator network 124 to generate an edited image 122. The generator network 124 is a neural network including a plurality of layers 202, e.g., convolutional layers or convolutional blocks. In the following discussion, the generator network 124 is described as including eighteen layers 202. However, it is to be appreciated, that the generator network 124 can include more or fewer layers 202 without departing from the spirit or scope of the described techniques. Moreover, it is to be appreciated that, in various scenarios, the generator network 124 is leveraged to generate an edited image 122 using a subset of the layers 202 of the generator network 124.

The system 200 further includes a mapping network 204 which is a multi-layer perceptron (MLP) network. Together, the mapping network 204 and the generator network 124 form a generative adversarial network (GAN). In at least one example, the mapping network 204 and the generator network 124 form a styleGAN, which is a type of GAN that is particularly well-suited for generating high quality synthetic images of humans. One key aspect of a styleGAN is the introduction of latent style vectors which enable a user to finely control particular attributes of a synthesized image.

Although the input image 118 is depicted in FIG. 1 as a portrait image of a human subject, it is to be appreciated that the generator network 124 is capable of editing input images 118 depicting any suitable object, including but not limited to inanimate objects, human faces, human bodies, and animals, to name just a few. Further, although the input image 118 is depicted in FIG. 1 as a photorealistic image, it is to be appreciated that the generator network 124 is capable of editing input images 118 with varying degrees of realism, including but not limited to sketches of objects, animated versions of objects, and the like.

In accordance with the described techniques, a latent vector 206 that defines the input image 118 is provided as input to the mapping network 204. In one or more implementations, the latent vector 206 is received together with a corresponding input image 118. Additionally or alternatively, the latent vector 206 is received individually without the corresponding input image 118. In variations, the latent vector 206 is defined with the purpose of corresponding to a particular image, or the latent vector 206 includes randomly selected values, and as such, is defined with the purpose of creating a random image. In at least one example, the latent vector 206, is a z vector in the $\mathcal{Z}$ latent space that corresponds to the input image 118.

The mapping network 204 is configured to generate a transformed latent vector 208 based on the latent vector 206. For example, the mapping network 204 receives the latent vector 206 as a z vector in the $\mathcal{Z}$ latent space, and outputs the transformed latent vector 208 as a w vector in the $\mathcal{W}$ latent space. Further, the transformed latent vector 208 is duplicated to produce a transformed latent vector 208 for each layer 202 of the generator network 124. In other words, the transformed latent vector 208 is converted to the $\mathcal{W}+$ space in which there are eighteen duplicated instances of the transformed latent vector 208, $w^{(l)}$, corresponding to the number of layers 202, l, in the generator network 124.

The duplicated instances of the transformed latent vector 208 are provided to corresponding layers 202 of the generator network 124 via layer specific affine operations 210. For example, the transformed latent vector 208 is transformed through a first layer specific affine operation 210 to produce a first latent style vector 212 for a first layer 202, the transformed latent vector 208 is transformed through a second layer specific affine operation 210 to produce a second latent style vector 212 for a second layer 202, and so on. Therefore, eighteen different latent style vectors 212 are produced through eighteen different layer specific affine operations. In other words, the transformed latent vector 208 is converted to the S latent space, in which there are eighteen different latent style vectors, $s^{(l)}$, corresponding to the number of layers 202, l, in the generator network 124. Unlike the transformed latent vectors 208 in the $\mathcal{W}+$ latent space, each latent style vector 212 in the S latent space includes a different set of values.

In accordance with the described techniques, the image transformation system 116 determines latent edit vectors 214 based on the text prompt 120—one latent edit vector 214 for each layer 202 of the generator network 124. In one or more implementations, the image transformation system 116 employs a global direction module 216 to determine the latent edit vectors 214, as further discussed below with reference to FIG. 5. In one or more alternative implementations, the image transformation system 116 employs a latent mapper module 218 to determine the latent edit vectors 214, as further discussed below with reference to FIG. 6. Generally, a latent edit vector 214 determined for a respective layer 202 represents a degree of change to apply to the transformed latent vector 208 to produce a combined latent vector 220. Further, the combined latent vector 220 is usable by a corresponding layer 202 of the generator network 124 to determine an edited feature that is modified in accordance with the text prompt 120, as further discussed below.

As shown, a combination operation 222 is applied to the latent edit vectors 214 and the duplicated instances of the transformed latent vector 208 to produce combined latent vectors 220—one for each layer 202 of the generator network 124. By way of example, a first latent edit vector 214 determined for a first layer 202 is combined with the transformed latent vector 208 to generate a combined latent vector 220 for the first layer 202, a second latent edit vector 214 determined for a second layer 202 is combined with the transformed latent vector 208 to generate a combined latent vector 220 for the second layer 202, and so forth.

Like the transformed latent vectors 208, the combined latent vectors 220 are provided to corresponding layers of the generator network 124 via the layer specific affine operations 210. For example, a combined latent vector 220 of a first layer 202 is transformed through a first layer specific affine operation 210 to produce an edited latent style vector 224 for the first layer 202, a combined latent vector 220 of a second layer 202 is transformed through a second layer specific affine operation 210 to produce an edited latent style vector 224 for the second layer 202, and so forth. Therefore, the combined latent vectors 220 are converted to the S latent space, in which there are eighteen different edited latent style vectors 224, $s^{(l)}$, corresponding to the number of layers 202, l, in the generator network 124.

In the following discussion, an example is discussed in which the generator network 124 is employed to generate a blended feature 226 for a respective layer 202 of the generator network 124, and as such, operations are described within the context of the respective layer 202 of the generator network 124. However, it is to be appreciated that similar operations are performed with respect to each layer of the generator network 124 in accordance with the techniques described herein.

Generally, the respective layer 202 of the generator network 124 is configured to generate an unedited feature 228 based on a corresponding latent style vector 212. In addition, the respective layer 202 of the generator network 124 is configured to generate an edited feature 230 based on a corresponding edited latent style vector 224. Further, a blending module 232 is employed to compute a blended feature 226 for the respective layer 202 based on the unedited feature 228 and the edited feature 230. The edited image 122 is generated by incorporating the blended features 226 computed for each layer 202 of the generator network 124 into the edited image 122.

More specifically, the respective layer 202 receives, as conditioning, a latent style vector 212 associated with the respective layer 202 and a previous blended feature 234, e.g., the blended feature 226 as output from a previous layer 202. As output, the respective layer 202 generates the unedited feature 228. Since the respective layer 202 processes the latent style vector 212 together with the previous blended feature 234, the unedited feature 228 incorporates the blended features 226 output by the blending module 232 at previous layers 202 of the generator network 124. Therefore, the unedited feature 228 output by the respective layer 202 incorporates the blended features 226 output at previous layers 202, and adds the set of attributes in the input image 118 that the particular layer 202 controls. Notably, when the first layer 202 of the generator network 124 is employed for computing a blended feature 226, the previous blended feature 234 corresponds to a constant feature, e.g., a learned tensor having a four pixel by four pixel resolution.

In addition, the respective layer 202 receives, as conditioning, an edited latent style vector 224 associated with the respective layer 202 and the previous blended feature 234. As output, the respective layer 202 generates the edited feature 230. Since the edited latent style vector 224 is processed together with the previous blended feature 234, the edited feature 230 incorporates the blended features 226 output at previous layers 202 of the generator network 124. Therefore, the edited feature 230 output by the respective layer 202 incorporates the blended features 226 output from previous layers 202, and includes edits based on the text prompt 120 to the set of attributes in the input image 118 controlled by the respective layer 202.

In one or more implementations, the image transformation system 116 is configured to generate masks 236 based on the text prompt 120—one for each layer 202 of the generator network 124. In one or more implementations, the image transformation system 116 employs a segment selection module 238 to generate the masks 236, as further discussed below, with reference to FIG. 3. In one or more alternative implementations, the image transformation system 116 employs a convolutional attention network 240 to generate the masks 236. Broadly, a mask 236 generated for the respective layer 202 identifies a local edit region that is to be modified by the respective layer 202 based on the text prompt 120 and the set of attributes controlled by the respective layer 202. In an example in which the respective layer 202 controls color and the text prompt 120 is "smile," the mask 236 generated for the respective layer 202 identifies a mouth region of a human subject depicted in the input image 118. This is because adding a smile to the human subject changes the color of the mouth region, e.g., from a skin tone shade to a tooth tone shade.

In accordance with the described techniques, the unedited feature 228 and the edited feature 230 output by the respective layer 202 are provided to the blending module 232, along with a mask 236 that is generated for the respective layer 202. The blending module 232 computes a blended feature 226 for the respective layer 202 by blending the unedited feature 228 and the edited feature 230 based on the mask 236. In particular, the blended feature 226 includes the unedited feature 228 outside the local edit region, and includes the edited feature 230 within the local edit region. By blending the unedited feature 228 and the edited feature 230 in this way, the blending module 232 ensures that the blended feature 226 is solely modified in the local edit region that is affected by the text prompt 120.

In one or more scenarios, the mask 236 generated for the respective layer 202 is a zero mask (e.g., the mask 236 does not identify a local edit region) because the set of attributes controlled by the respective layer 202 is not modified based on the text prompt 120. In these scenarios, the blended feature 226 computed for the respective layer 202 is the unedited feature 228. This is because the zero mask instructs the blending module 232 not to include any portion of the edited feature 230 in the blended feature 226. As previously mentioned, the unedited feature 228 incorporates the blended features 226 output by the blending module 232 at previous layers 202 of the generator network 124. Accordingly, in scenarios in which the mask 236 is a zero mask, the blended feature 226 also incorporates the blended features 226 output at previous layers 202 of the generator network 124. Thus, conditioning the layers 202 of the generator network 124 on previous blended features 234 ensures that edits made at previous layers 202 of the generator network 124 are propagated to subsequent layers 202 of the generator network 124, even when a zero mask is utilized for the feature blending.

The blended feature 226 is then fed forward to a subsequent layer 202 of the generator network 124, and the above-described example process with respect to the respective layer 202 is repeated for each subsequent layer 202 of the generator network 124. Given this, the first layer 202 of the generator network 124 receives, as input, the latent style vector 212 and the edited latent style vector 224 associated with the first layer 202, as well as the constant feature which has a four pixel by four pixel resolution. Additionally, the first layer 202 outputs the unedited feature 228 and the edited feature 230 to the blending module 232. The blending module 232 additionally receives the mask 236 associated with the first layer 202, and outputs the blended feature 226.

In a subsequent iteration, the second layer 202 of the generator network 124 receives, as input, the latent style vector 212 and the edited latent style vector 224 associated with the second layer 202, as well as the previous blended feature 234 as output from the first layer 202. In addition, the second layer 202 outputs the unedited feature 228 and the edited feature 230 to the blending module 232. The blending module 232 additionally receives the mask 236 associated with the second layer 202 and outputs the blended feature 226.

In a third iteration, the blended feature 226 as output from the second layer is then upsampled to have an eight pixel by eight pixel resolution before being provided to the third layer 202 of the generator network 124. This process is repeated for each subsequent layer 202 of the generator network 124, where the blended feature 226 output at every second layer 202 is upsampled before being provided to a subsequent layer 202. Therefore, a blended feature 226 generated for a final layer 202 of the generator network has a 1024×1024 resolution. To generate the edited image 122, the blended feature 226 output at a final layer of the generator network 124 is converted to a color space, e.g., the RGB color space. Since each blended feature 226 incorporates the blended features 226 output at previous layers of the generator network 124, the edited image 122 incorporates the blended features 226 computed for each layer of the generator network 124.

By upsampling the blended feature 226 at every other layer of the generator network 124 the unedited features 228 and the edited features 230 output by subsequent layers 202 have increasingly higher resolutions. Due to this, a first set of layers (e.g., layers one through four) are responsible for controlling low resolution or coarse attributes in the input image 118 (e.g., position), a second set of layers (e.g., layers five through eight) are responsible for controlling intermediate resolution or medium attributes in the input image 118 (e.g., structure), and a third set of layers (e.g., layers nine through eighteen) are responsible for controlling high resolution or fine attributes in the input image 118, e.g., appearance.

Given the above, the edited image 122 generated by the generator network 124 is representable as $I^* = \Sigma_{l=1}^{18} RGB^l (f^{*(l)})$ in which $f^{*(l)}$ is the blended feature 226 at a particular layer, l, and $RGB^l$ is a trained machine learning model to convert the blended feature 226 to the RGB color space. Further, the blended features 226 are representable as $f^{*(l)} = m^l \odot \widehat{f^{*(l)}} + (1-m^l) \odot \widehat{f^{(l)}}$ in which $m^l$ is the mask 236 generated for the particular layer 202. $\widehat{f^{*(l)}}$ is the edited feature 230 generated by the particular layer 202, and $\widehat{f^{(l)}}$ is the unedited feature 228 generated by the particular layer 202. Moreover, the unedited features 228 are representable as $\widehat{f^{(l)}} = \Phi^l(f^{*(l-1)} w^l)$ and the edited features 230 are representable as $\widehat{f^{*(l)}} = \Phi f^{*(l-1)}, (w^l + \Delta^{(l)}))$. In these equations, $\Phi^l$ is a current layer 202 of the generator network 124, $w^l$ is the transformed latent vector 208 that is provided to the current layer 202 via the layer specific affine operation 210, $f^{*(l-1)}$ is the blended feature 226 from the previous layer 202, $w^l + \Delta^{(l)}$ represents the combined latent vector 220 that is provided to the current layer 202 via the layer specific affine operation 210, and $f^{(0)}$ is the constant feature.

Figure 3:
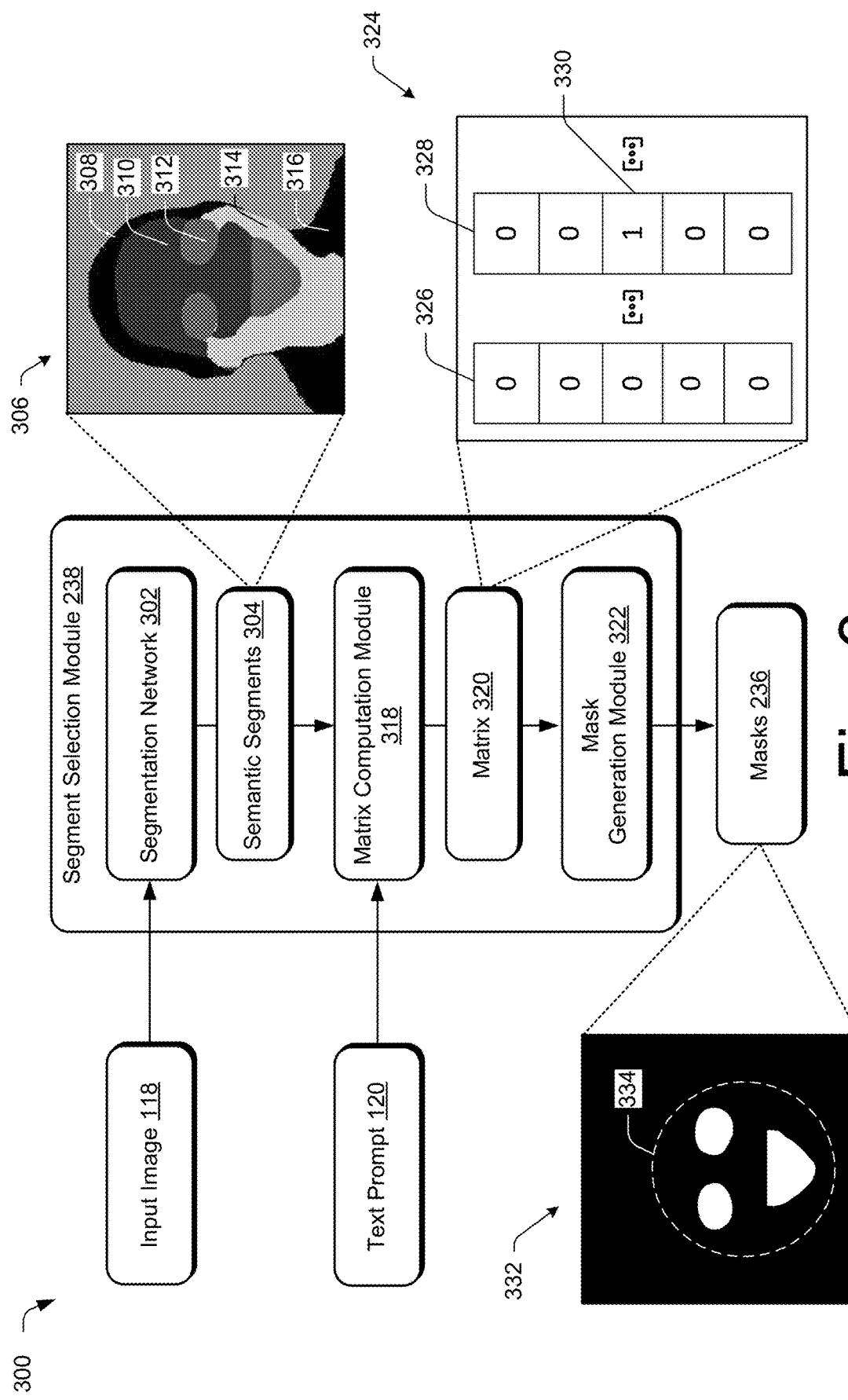
FIG. 3 depicts a system in an example implementation showing operation of a segment selection module.

FIG. 3 depicts a system 300 in an example implementation showing operation of a segment selection module 238. As shown, the segment selection module 238 includes a segmentation network 302 that is configured to partition the input image 118 into a number of semantic segments 304. Generally, the segmentation network 302 is a machine learning model that is trained to partition images depicting a type of object into predefined segments or portions. Thus, in examples in which the input image 118 depicts a human subject, the segmentation network 302 partitions the input image 118 into semantic segments 304 that each identify a different portion of the human subject.

As shown at 306, for example, the segmentation network 302 is employed to partition the input image 118 into five different semantic segments: a first semantic segment 308 identifying the hair and ears of the human subject, a second semantic segment 310 identifying the forehead, nose, and cheeks of the human subject, a third semantic segment 312 depicting the eyes and mouth of the human subject, a fourth semantic segment 314 depicting the chin and neck of the human subject, and a fifth semantic segment 316 depicting the body of the human subject. Although depicted as a five-segment segmentation network 302 to partition a portrait image of a human subject, it is to be appreciated that the segmentation network 302 is configured to partition any suitable object depicted in the input image 118 into any number of semantic segments 304, in variations.

The semantic segments 304 and the text prompt 120 are provided as input to a matrix computation module 318, which is configured to compute a matrix 320. Broadly, the matrix 320 is usable by a mask generation module 322 to select which ones of the semantic segments 304 are to be edited in accordance with the text prompt 120 at each layer 202 of the generator network 124. In at least one example, the matrix 320 includes columns that represent different layers 202 of the generator network 124, and rows that represent different semantic segments 304. Further, the matrix computation module 318 populates entries of the matrix 320 with confidence values indicating degrees of likelihood that respective layers of the generator network 124 affect corresponding semantic segments 304 based on the text prompt 120.

In one or more implementations, the confidence values are populated on a scale of zero to one, e.g., a confidence value of one indicates a highest likelihood that a semantic segment 304 is affected by a corresponding layer 202 of the generator network 124, and a confidence value of zero indicates a lowest likelihood that a semantic segment 304 is affected by a corresponding layer 202 of the generator network 124. As further discussed below with reference to FIG. 7, the confidence values in the matrix 320 are learned through a machine learning process.

Consider a non-limiting example at 324, in which a matrix 320 is computed based on the text prompt 120 "smile." In this example, the matrix 320 includes eighteen columns each representing a different layer 202 of the generator network 124, and five rows each representing a different semantic segment 304. In particular, a first column 326 represents a coarse layer 202 in the first group of layers responsible for controlling positioning, and a second column 328 represents a fine layer 202 in the third group of layers responsible for controlling color. Further, a first row of the matrix 320 represents the first semantic segment 308, a second row of the matrix 320 represents the second semantic segment 310, a third row of the matrix 320 represents the third semantic segment 312, and so on. Since adding a smile to the human subject does not affect the positioning of the human subject within the input image 118, the matrix computation module 318 populates each entry of the first column 326 with a zero confidence value. However, since adding a smile to the human subject involves changing the color of the mouth region from a skin tone shade to a tooth tone shade, the matrix computation module 318 populates the third row of the second column 328 with a confidence value 330 of one.

The matrix 320 is provided to the mask generation module 322, which is configured to generate the masks 236. More specifically, the matrix computation module 318 generates a mask 236 for each respective layer 202 of the generator network 124 that indicates a local edit region where the set of attributes of the respective layer 202 are affected based on the text prompt 120. To do so, the mask generation module 322 converts each respective column in the matrix 320 to a mask 236 that identifies, as the local edit region, the semantic segments 304 in the respective column having confidence values that exceed a threshold value, e.g., all semantic segments in a particular column having a confidence value that exceeds 0.5. In addition, the mask generation module 322 resizes each of the masks 236 to have a resolution corresponding to the unedited and edited features 228, 230 output by the corresponding layer 202.

Consider a non-limiting example at 332 in which a mask 236 is generated for the fine layer 202 of the generator network 124 represented by the second column 328 of the matrix 320. As shown, the mask 236 generated for the fine layer 202 identifies, as the local edit region 334, the third semantic segment 312 represented by the third row (e.g., the eyes and mouth region) that has a confidence value that exceeds 0.5 in the matrix 320. In contrast, the mask 236 generated for the coarse layer 202 that is represented by the first column 326 (not depicted) does not identify a local edit region because all entries in the first column 326 have a zero confidence value. In other words, the mask 236 generated for the coarse layer 202 is a zero mask. The mask generation module 322 similarly generates a mask 236 for each layer 202 of the generator network 124 based on the confidence values in the matrix 320.

Depending on the text prompt 120, the segment selection module 238 is subject to over selection of the local edit region as a result of the semantic segments 304 that are partitionable by the segmentation network 302. As shown in the illustrated example, the segmentation network 302 combines the eye region and the mouth region into a single semantic segment 304. Thus, given the text prompt 120 "smile" which only affects the color of the mouth region of the human subject, the mask generation module 322 is configured to generate a mask 236 that identifies, as the local edit region, both the mouth region and the eye region, as shown at 332.

Figure 4:
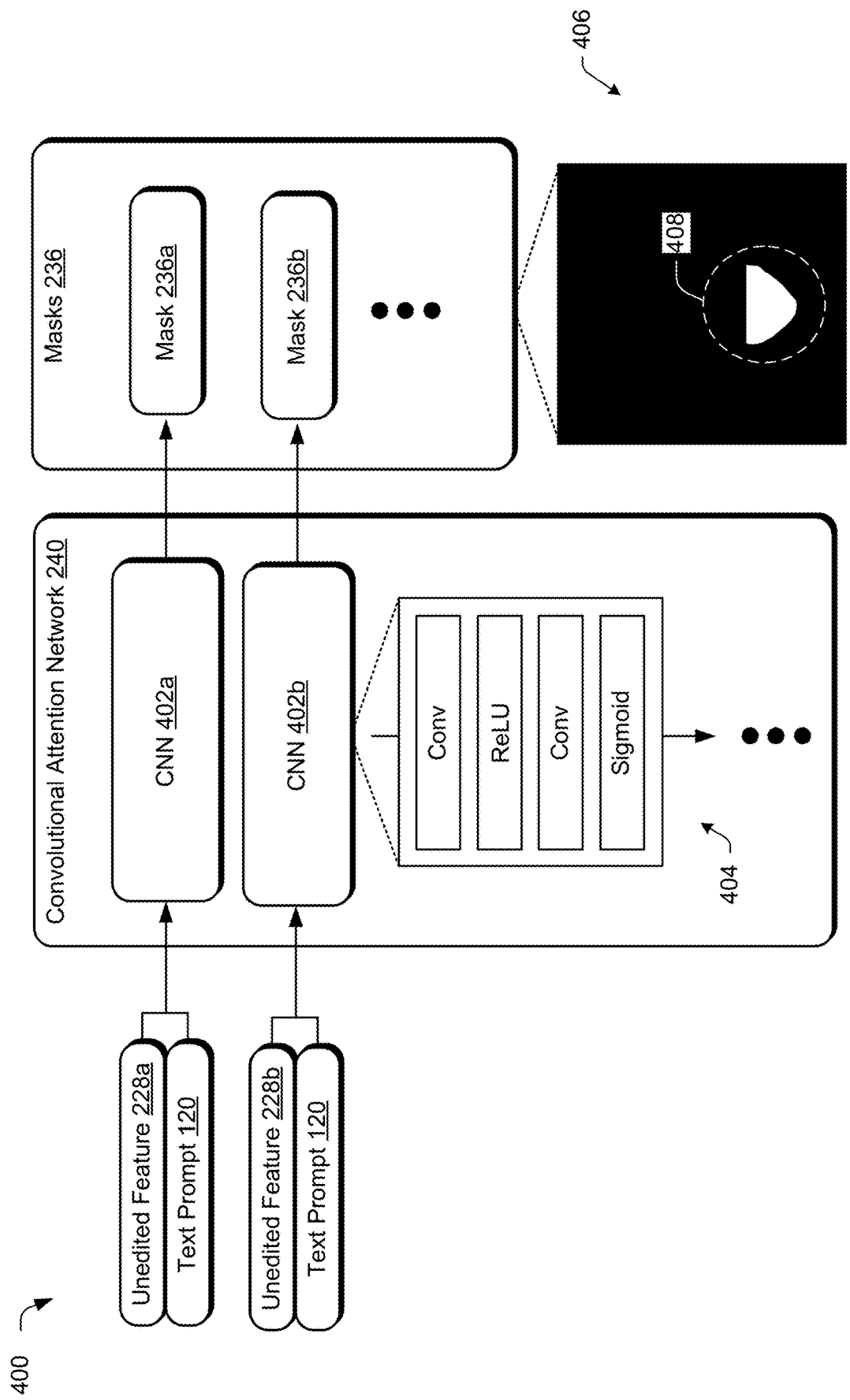
FIG. 4 depicts a system in an example implementation showing operation of a convolutional attention network.

FIG. 4 depicts a system 400 in an example implementation showing operation of a convolutional attention network 240. As shown the convolutional attention network 240 includes a plurality of convolutional neural networks (CNNs), one CNN 402 for each layer of the generator network 124. Broadly, each of the CNNs 402 receives, as input, the unedited feature 228 output by a respective layer 202 and the text prompt 120. Further, each of the CNNs 402 outputs a mask 236 that identifies a local edit region where the set of attributes of the respective layer 202 are affected based on the text prompt 120. In addition, the mask 236 output by a respective CNN 402 is a same resolution as the unedited feature 228 provided as input to the respective CNN 402.

By way of example, the text prompt 120 and the unedited feature 228a output by a first layer 202 of the generator network 124 are provided to a first CNN 402a. The first CNN 402a is configured to generate a mask 236a that identifies a local edit region that is to be edited by the first layer 202 based on the text prompt 120 and having a same resolution as the unedited feature 228a. Further, the text prompt 120 and the unedited feature 228b output by a second layer 202 of the generator network 124 are provided as input to a second CNN 402b. The second CNN 402b is configured to generate a mask 236b that identifies a local edit region that is to be edited by the second layer 202 based on the text prompt 120 and having a same resolution as the unedited feature 228b. This process is then repeated to generate a mask 236 for each layer 202 of the generator network 124. Similar to the segment selection module 238, a respective CNN 402 of the convolutional attention network 240 is configured to output a zero mask for a layer 202 of the generator network 124 that does not affect the input image 118 based on the text prompt 120.

As further discussed below with reference to FIG. 7, the CNNs 402 are trained to generate the masks 236. An example architecture of the CNNs 402 is depicted at 404. As shown, each of the CNNs include a first convolutional layer, a Rectified Linear Unit (ReLU) activation function, a second convolutional layer, and a sigmoid activation function. In particular, the first and second convolutional layers are 1×1 convolutional layers.

Consider a non-limiting example at 406, in which a mask 236 is generated based on the text prompt 120 "smile" by one of the CNNs 402 for a fine layer 202 of the third group responsible for controlling color. Since adding a smile to the human subject involves changing the color of the mouth region from a skin tone shade to a tooth tone shade, the CNN 402 generates a mask 236 identifying, as the local edit region 408, the mouth region of the human subject. Since the color of the input image 118 is solely affected in a mouth region of the human subject, the CNN 402 solely identifies the mouth region as the local edit region 408. This contrasts with the mask 236 generated by the segment selection module 238, shown at 332 of FIG. 3, which includes the eye region as the local edit region despite the color of the eyes not being affected by the text prompt 120. This is because the CNNs 402 are not confined to identifying, as the local edit region, predefined semantic segments that are partitionable by a segmentation network.

As previously mentioned, both the segment selection module 238 and the convolutional attention network 240 have trainable parameters that are learned through a machine learning process. In particular, the trainable parameters of the segment selection module 238 include the confidence values of the matrix 320, while the trainable parameters of the convolutional attention network 240 include the CNNs 402. In terms of training time, the confidence values of the matrix 320 are learned faster than the CNNs 402. Thus, the convolutional attention network 240 generates the masks 236 having increased accuracy in the predicted local edit regions, as compared to the segment selection module 238. However, the confidence values in the matrix 320 are learned with increased speed, as compared to training the CNNs 402.

Figure 5:
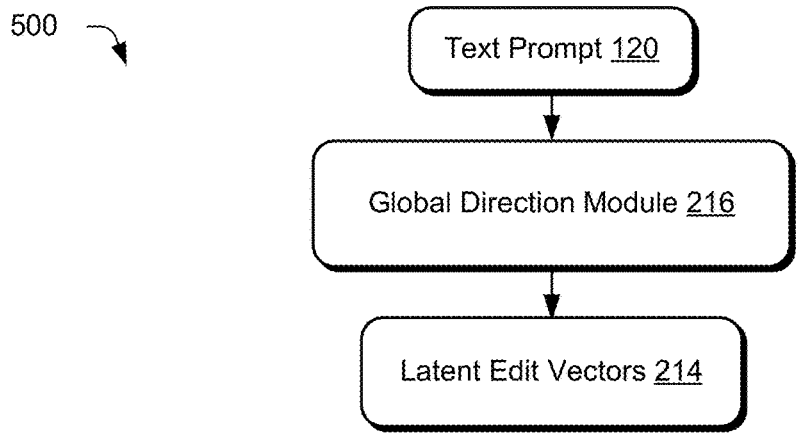
FIG. 5 depicts a system in an example implementation showing operation of a global direction module.

FIG. 5 depicts a system 500 in an example implementation showing operation of a global direction module 216. As shown, the global direction module 216 receives, as input, the text prompt 120. Based on the text prompt 120, the global direction module 216 determines the latent edit vectors 214. More specifically, the global direction module 216 determines a different latent edit vector 214 for each layer 202 of the generator network 124. As further discussed above with reference to FIG. 2, the latent edit vectors 214 are each combined with the transformed latent vector 208 to produce combined latent vectors 220, and the combined latent vectors 220 are used by corresponding layers 202 of the generator network 124 to determine the edited features 230.

A "global direction" is considered to be determined for the latent edit vectors 214 because the latent edit vectors 214 are independent of the input image 118. In other words, latent edit vectors 214 determined for the text prompt 120 "beard" are applicable to transform any input image 118 to include or enhance a beard of a depicted human subject. Further, the latent edit vectors 214 determined for the text prompt 120 "smile" are applicable to transform any input image 118 to include or enhance a smile of a depicted human subject. However, the latent edit vectors 214 are dependent on the text prompt 120, and therefore, the latent edit vectors 214 determined for the text prompt 120 "smile" are different than the latent edit vectors 214 determined for the text prompt 120 "beard." As further discussed below with reference to FIG. 7, the latent edit vectors 214 determined by the global direction module 216 are learned through a machine learning process.

Figure 6:
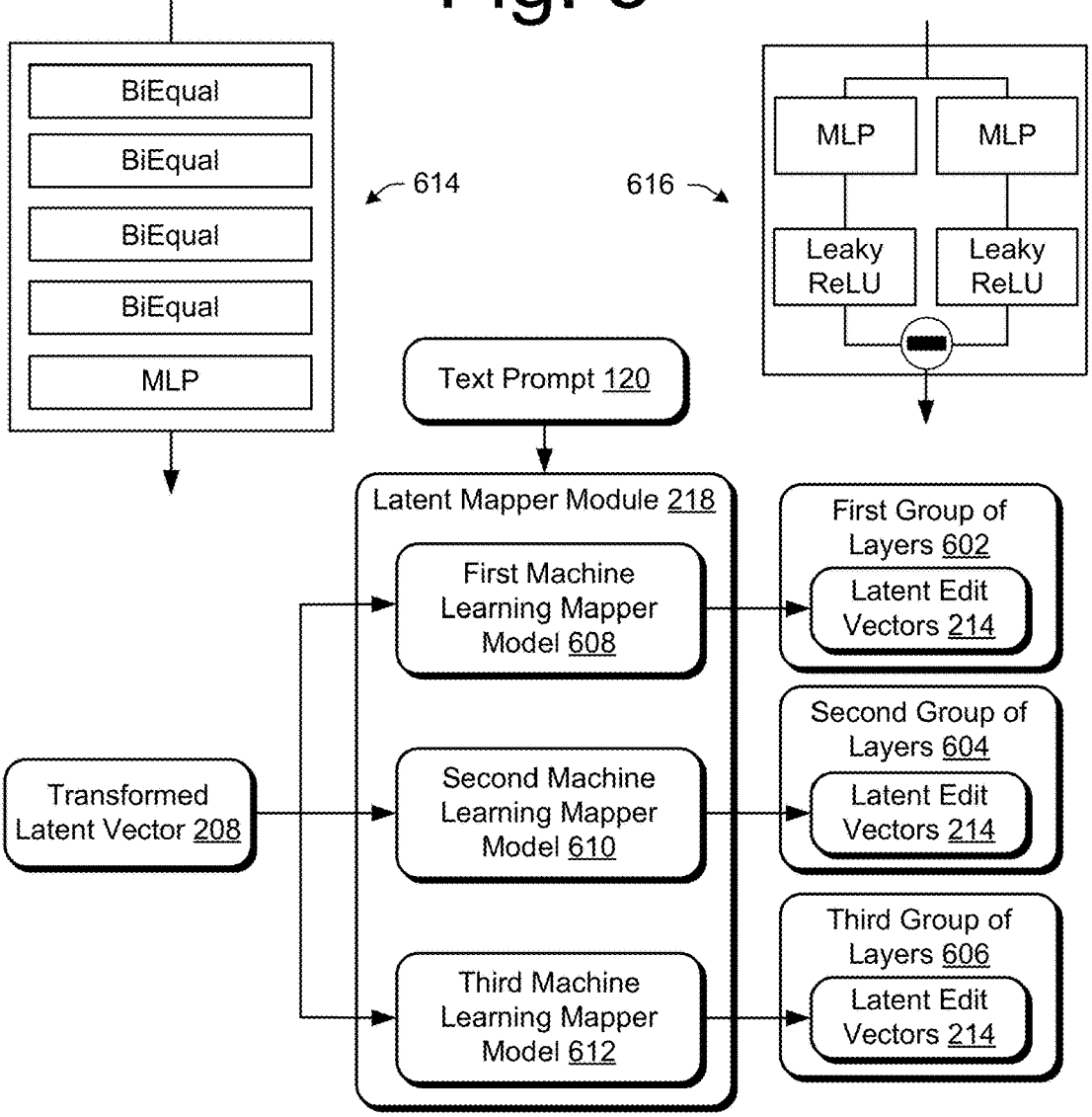
FIG. 6 depicts a system in an example implementation showing operation of a latent mapper module.

FIG. 6 depicts a system 600 in an example implementation showing operation of a latent mapper module 218. As previously discussed, the transformed latent vector 208 is converted to the $\mathcal{W}+$ space in which there are eighteen duplicated instances of the transformed latent vector 208, $w^{(l)}$, in which $l \in \{1, 2, \ldots, 18\}$. Further, a first group of layers 602 are responsible for controlling low resolution or coarse attributes in the input image 118 (e.g., position), a second group of layers 604 are responsible for controlling intermediate resolution or medium attributes in the input image 118 (e.g., structure), and a third group of layers 606 are responsible for controlling high resolution or fine attributes in the input image 118 (e.g., appearance). As shown, the latent mapper module 218 includes a first machine learning mapper model 608 configured to determine latent edit vectors 214 for the first group of layers 602, a second machine learning mapper model 610 configured to determine latent edit vectors 214 for the second group of layers 604, and a third machine learning mapper model 612 configured to determine latent edit vectors 214 for a third group of layers 606. To determine the latent edit vectors 214, the machine learning mapper models 608, 610, 612 are conditioned on the transformed latent vector 208 and the text prompt 120.

Consider an example in which the first group of layers 602 includes layers 202 one through four, the second group of layers 604 includes layers 202 five through eight, and the third group of layers 606 includes layers 202 nine through eighteen. In this example, the duplicated instances of the transformed latent vector 208 are divided into three groups, a first group of transformed latent vectors 208 including $w^{(1)}$ through $w^{(4)}$, a second group of transformed latent vectors including $w^{(5)}$ to $w^{(8)}$, and a third group of transformed latent vectors 208 including $w^{(9)}$ to $w^{(18)}$. In this example, the first machine learning mapper model 608 receives the transformed latent vector 208, $w^{(1)}$, and the text prompt 120, and outputs a latent edit vector 214 for the first layer 202. This process is then repeated by the first machine learning mapper model 608 for each layer in the first group of layers 602. Further, the second machine learning mapper model 610 receives the transformed latent vector 208, $w^{(5)}$, and the text prompt 120, and outputs a latent edit vector 214 for the fifth layer 202. This process is then repeated by the second machine learning mapper model 610 for each layer 202 in the second group of layers 604. Finally, the third machine learning mapper model 612 receives the transformed latent vector 208, $w^{(9)}$, and the text prompt 120, and outputs a latent edit vector 214 for the ninth layer 202. This process is then repeated by the third machine learning mapper model 612 for each layer in the third group of layers 606.

Therefore, to determine the latent edit vectors 214, each machine learning mapper model 608, 610, 612 individually processes the transformed latent vector 208 together with the text prompt 120 for each layer 202 within a corresponding group of layers. In one or more implementations, the machine learning mapper models 608, 610, 612 are leveraged to concurrently determine the latent edit vectors 214 for the first, second, and third groups of layers 602, 604, 606, respectively. Notably, the latent edit vectors 214 are different as determined for different layers of the generator network 124.

In contrast to the latent edit vectors 214 determined by the global direction module 216, the latent edit vectors 214 determined by the latent mapper module 218 are input image 118 dependent. By way of example, a latent edit vector 214 (determined by the latent mapper module 218) has a set of values when determined for a particular layer 202 of the generator network 124 based on a text prompt 120 and an input image 118. Further, a latent edit vector 214 (determined by the latent mapper module 218) has a different set of values when determined for the same layer 202 of the generator network 124 based on the same text prompt 120, but a different input image 118. This is because the machine learning mapper models 608, 610, 612 are conditioned on the transformed latent vector 208 which is different for different input images 118.

In one or more implementations, the machine learning mapper models 608, 610, 612 are multi-layer perceptron (MLP) models. An example architecture of the machine learning mapper models 608, 610, 612 is depicted at 614. As shown, each of the machine learning mapper models 608, 610, 612 include four BiEqual linear layers, followed by an MLP layer. Further, an example architecture of a BiEqual layer is depicted at 616. As shown, each BiEqual layer includes two MLP layers, each of which are followed by a Leaky Rectified Linear Unit (Leaky ReLU) activation function. Further, a differencing operation is applied to produce an output of the BiEqual layer. As further discussed below with reference to FIG. 7, the machine learning mapper models 608, 610, 612 are trained to determine the latent edit vectors 214.

As previously mentioned, both the global direction module 216 and the latent mapper module 218 have trainable parameters that are learned through a machine learning process. The trainable parameters of the global direction module 216 are the latent edit vectors 214, while the trainable parameters of the latent mapper module 218 are the machine learning mapper models 608, 610, 612. In terms of training time, the latent edit vectors determined by the global direction module 216 are learned faster than the machine learning mapper models 608, 610, 612. Furthermore, the latent edit vectors 214 determined by the global direction module 216 are usable by the generator network 124 to generate images that are accurately updated in accordance with simple text prompts, e.g., which impact a relatively small number of attributes in the input image 118. However, the latent edit vectors 214 determined by the latent mapper module 218 are usable by the generator network 124 to generate images that are more accurately updated in accordance with complex text prompts (e.g., which impact a relatively large number of attributes in the input image 118), as compared to the latent edit vectors 214 determined by the global direction module 216.

Figure 7:
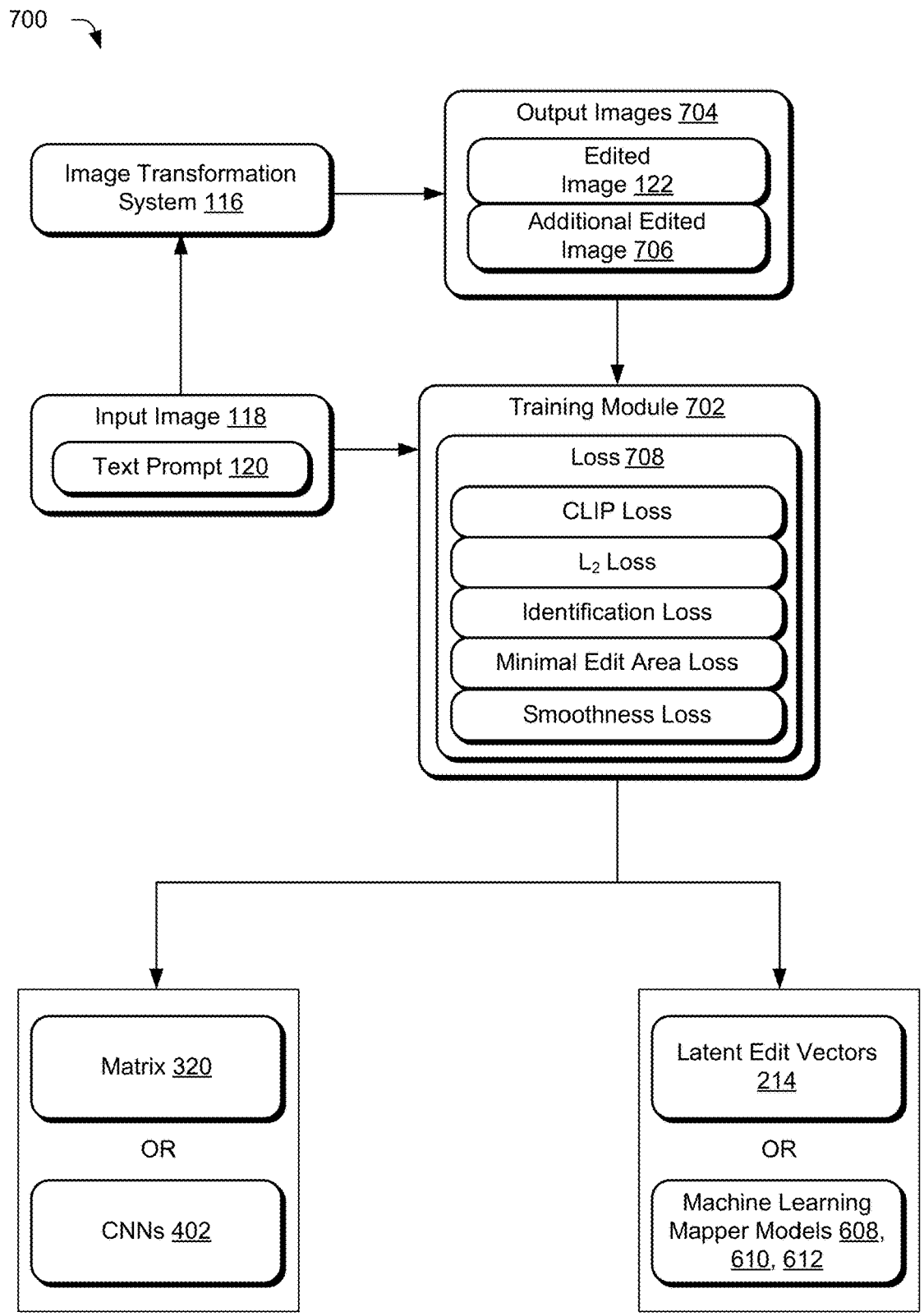
FIG. 7 depicts a system in an example implementation showing operation of a training module.

FIG. 7 depicts a system 700 in an example implementation showing operation of a training module 702. As shown, the input image 118 is provided to the training module 702. In addition, the input image 118 is provided to the image transformation system 116, which is configured to generate output images 704. The output images 704 include the edited image 122 and an additional edited image 706. As previously mentioned, the edited image 122 incorporates the blended features 226 output at each layer 202 of the generator network 124. In contrast, the additional edited image 706 incorporates the edited features 230 output by each layer 202 of the generator network 124, i.e., without blending the edited features 230 with the unedited features 228 using the masks 236. Generally, the training module 702 uses machine learning to update the matrix 320, the CNNs 402, the latent edit vectors 214 as determined by the global direction module 216, and/or the machine learning mapper models 608, 610, 612 to minimize a loss 708. Broadly, machine learning utilizes algorithms to learn from, and make predictions on, known data by analyzing the known data to learn to generate outputs that reflect patterns and attributes of the known data.

The image transformation system 116 employs the global direction module 216 or the latent mapper module 218 to determine the latent edit vectors 214. In scenarios in which the global direction module 216 is employed, the training module 702 is configured to update the latent edit vectors 214 determined by the global direction module 216 to minimize the loss 708. In scenarios in which the latent mapper module 218 is employed, the training module 702 updates weights associated with the MLP layers of the machine learning mapper models 608, 610, 612 to minimize the loss 708.

Moreover, the image transformation system 116 employs the segment selection module 238 or the convolutional attention network 240 to generate the masks 236. In scenarios in which the segment selection module 238 is employed, the training module 702 is configured to update the confidence values in the matrix 320 to minimize the loss 708. In scenarios in which the convolutional attention network 240 is employed, the training module 702 is configured to update weights associated with the convolutional layers of the CNNs 402 to minimize the loss 708.

In implementations in which the segment selection module 238 is employed, the loss 708 is represented by the equation (1), below. Further, in implementations in which the convolutional attention network 240 is employed, the loss 708 is represented by the following equation (2), below.

$$\mathcal{L}_{ss} = \mathcal{L}_{CLIP} + \lambda_{l_2}\mathcal{L}_{l_2} + \lambda_{id}\mathcal{L}_{id} + \lambda_{area}\mathcal{L}_{area}^{ss} \quad (1)$$

$$\mathcal{L}_{con} = \mathcal{L}_{CLIP} + \lambda_{l_2}\mathcal{L}_{l_2} + \lambda_{id}\mathcal{L}_{id} + \lambda_{area}\mathcal{L}_{area}^{con} + \lambda_{tv}\mathcal{L}_{tv} \quad (2)$$

In the equations above, $\mathcal{L}_{CLIP}$ represents CLIP loss, $\mathcal{L}_{l_2}$ represents $L_2$ loss, $\mathcal{L}_{id}$ represents identification loss, $\mathcal{L}_{area}^{ss}$ represents minimal edit area loss for the masks 236 generated by the segment selection module 238, $\mathcal{L}_{area}^{con}$ represents minimal edit area loss for the masks 236 generated by the convolutional attention network 240, and $\mathcal{L}_{tv}$ represents smoothness loss. Furthermore, $\lambda_{l_2}$, $\lambda_{id}$, $\lambda_{area}$, and $\lambda_{tv}$ are the weights assigned to the various losses.

To determine the CLIP loss, the training module 702 utilizes the following equation:

$$\mathcal{L}_{CLIP} = \frac{1}{2}(D_{CLIP}(I^*, t) + D_{CLIP}(I^\sim, t)) \quad (3)$$

In the equation above, $D_{CLIP}$ represents a contrastive language-image pre-training (CLIP) model. Notably, the CLIP model is pre-trained on a multitude of image, text pairs to learn a multi-modal embedding space to embed a first latent vector defining the image, and a second latent vector defining the text prompt in a same latent space. In this way, the CLIP model determines semantic similarity between an image and a text prompt. In equation (3), I* represents the edited image 122, I~ represents the additional edited image 706, and t represents the text prompt 120. Therefore, $(D_{CLIP}$ (I*, t) represents a first measure of similarity between the text prompt 120 and the edited image 122, as determined by the CLIP model. Further, $D_{CLIP}$(I~, t) represents a second measure of similarity between the text prompt 120 and the additional edited image 706, as determined by the CLIP model. The training module 702 determines the CLIP loss by combining the first and second measures of similarity. Thus, the CLIP loss enforces adherence of the edited image 122 to the text prompt 120.

To determine the $L_2$ loss, the training module 702 utilizes the following equation:

$$\mathcal{L}_{l_2} = \|\Delta\|_2^2 \quad (4)$$

In the equation above, $\Delta$ represents the latent edit vectors 214 that are used by the generator network 124 to output the edited features 230. Therefore, $\|\Delta\|_2^2$ represents the squared Euclidean norm of the latent edit vectors 214. Since the latent edit vectors 214 are different for different layers 202 of the generator network 124, the $L_2$ loss is a combination of the squared Euclidean norm of the various layer specific latent edit vectors 214. Thus, the $L_2$ loss enforces smaller latent edits being made to the transformed latent vector 208.

To determine the identification loss, the training module 702 utilizes the following equation:

$$\mathcal{L}_D = 1 - \langle \mathcal{R}(I^*), \mathcal{R}(I) \rangle \quad (5)$$

In the equation above, $\mathcal{R}$ represents a pre-trained ArcFace network. Broadly, the ArcFace network is a network trained using machine learning to receive two images as input, and output a measure of likelihood that the two images include the same person. Further, in equation (5), I* represents the edited image 122 and I represents the input image 118, and the identification loss represents a measure of likelihood that the edited image 122 and the input image 118 depict the same person. Therefore, the identification loss enforces identity preservation of the depicted human subject. As previously mentioned, the image transformation system 116 is employed to generate an edited image 122 from an input image 118 that depicts a non-human subject in various scenarios. In such cases, the identification loss is not a part of the loss equation.

In implementations in which the segment selection module 238 is employed to generate the masks 236, the minimal edit area loss is defined by the following equation:

$$\mathcal{L}_{area}^{ss} = \sum_{i,j} e_{i,j} \quad (6)$$

In the equation above, e represents the matrix 320. Therefore, the minimal edit area loss in equation (6) is a summation of all confidence values in the matrix 320, and increases when the masks 236 identify larger local edit regions to which edits are to be made. In implementations in which the convolutional attention network 240 is employed to generate the masks 236, the minimal edit area loss is defined by the following equation:

$$\mathcal{L}_{area}^{con} = \sum_{l} n_l \left( \sum_{i,j} m_{i,j}^{(l)} \right) \quad (7)$$

In the equation above, $m^{(l)}$ represents a mask generated by the convolutional attention network 240 for a particular layer, l. Further, $n_l$ is a normalizing constant defined per layer to account for growing feature resolutions as the blended features 226 are fed forward to subsequent layers 202 in the generator network 124. Therefore, the minimal edit area loss in equation (7) captures the sizes of the local edit regions in the masks 236 to which edits are to be made, and increases when the masks 236 identify local edit regions that are larger in size. Given this, the minimal edit area loss enforces edits being made to smaller areas of the input image 118.

In implementations in which the convolutional attention network 240 is employed to generate the masks 236, the smoothness loss is defined by the following equation:

$$\mathcal{L}_{tv} = \sum_{i,j,l} \|m_{i,j}^{(l)} - m_{(i+1),j}^{(l)}\|_2^2 + \sum_{i,j,l} \|m_{i,j}^{(l)} - m_{i,(j+1)}^{(l)}\|_2^2 \quad (8)$$

In this equation, $\mathcal{L}_{tv}$ captures the total variation loss in the masks 236 generated by the convolutional attention network 240, and enforces spatial smoothness in the masks 236.

After the loss 708 is computed, the training module 702 adjusts the confidence values in the matrix 320 or the convolutional layers in the CNNs 402 to minimize the loss 708. Additionally, the training module 702 adjusts the latent edit vectors 214 determined by the global direction module 216 or the MLP layers of the machine learning mapper models 608, 610, 612 to minimize the loss 708. These parameters are iteratively adjusted until the loss 708 converges to a minimum or until a threshold number of iterations have completed. Upon convergence or the threshold number of iterations being completed, the image transformation system 116 is deployed to generate the edited image 122 that is transformed in accordance with the text prompt 120.

Example Procedure

The following discussion describes techniques that are implementable utilizing the previously described systems and devices. Aspects of the procedure are implemented in hardware, firmware, software, or a combination thereof. The procedure is shown as a set of blocks that specify operations performed by one or more devices and is not necessarily limited to the orders shown for performing the operations by the respective blocks. In portions of the following discussion, reference will be made to FIGS. 1-7.

Figure 8:
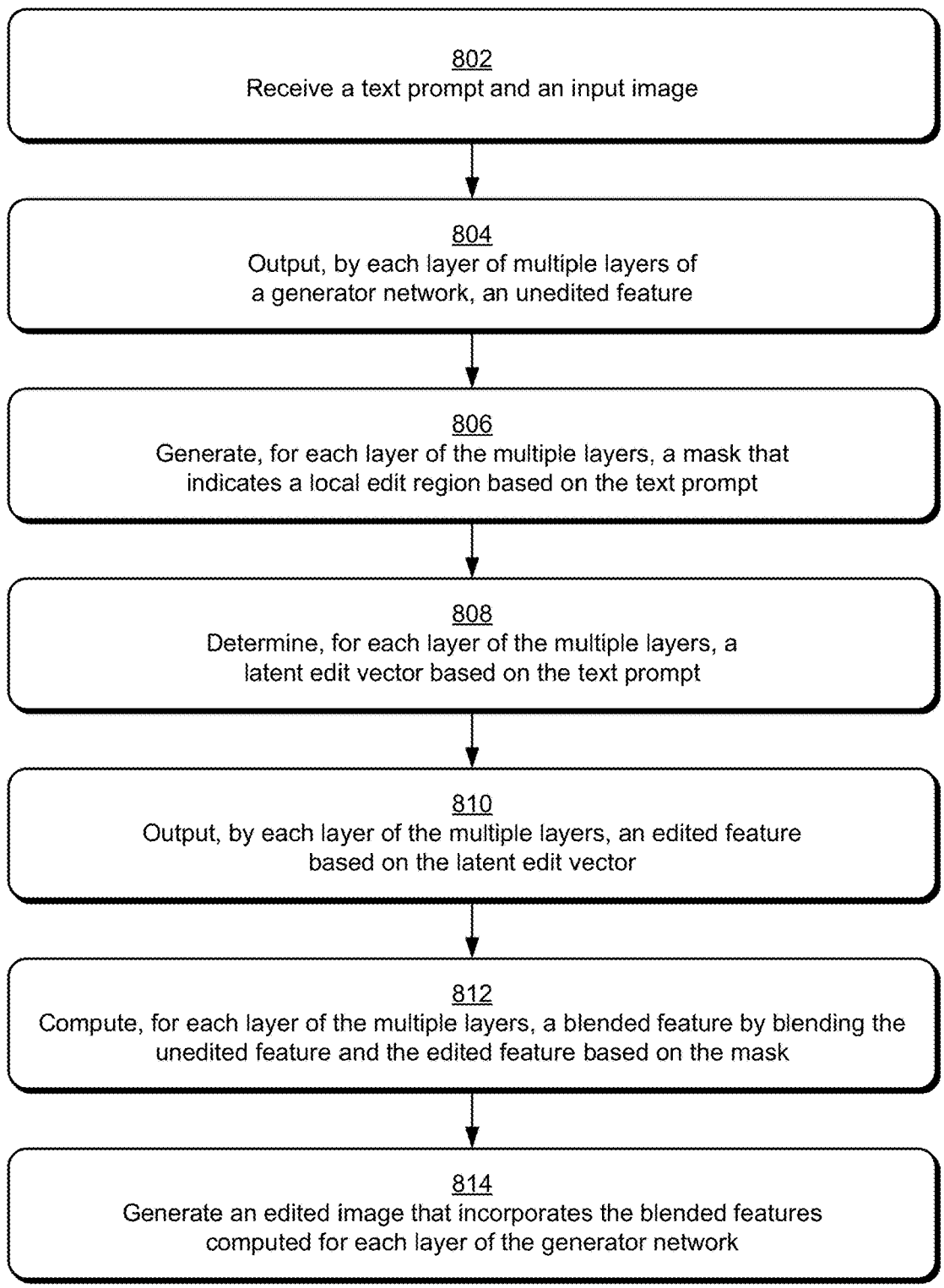
FIG. 8 is a flow diagram depicting a procedure in an example implementation for mask conditioned image transformation based on a text prompt.

FIG. 8 is a flow diagram depicting a procedure 800 in an example implementation for mask conditioned image transformation based on a text prompt. In the procedure 800, an input image and a text prompt are received (block 802). For example, the image transformation system 116 receives the input image 118 and the text prompt 120. Broadly, the image transformation system 116 is configured to leverage the generator network 124 to edit the input image 118 to include or enhance a target attribute identified by the text prompt 120.

An unedited feature is output by each layer of multiple layers of a generator network (block 804). For example, each respective layer 202 outputs an unedited feature 228 conditioned on the latent style vector 212 associated with the respective layer 202 and the previous blended feature 234, e.g., the blended feature 226 output from a previous layer 202 of the generator network 124. The unedited feature 228 output by a respective layer 202 incorporates the blended features 226 output at previous layers 202, and adds the set of attributes in the input image 118 that the particular layer 202 controls.

A mask is generated for each layer of the multiple layers that indicates a local edit region based on the text prompt (block 806). By way of example, the image transformation system 116 generates a mask 236 for each respective layer 202 of the generator network 124 that identifies a local edit region where the set of attributes of the respective layer 202 are affected based on the text prompt 120. In one or more implementations, the image transformation system 116 employs the segment selection module 238 to generate the masks 236. Alternatively, the image transformation system 116 employs the convolutional attention network 240 to generate the masks 236.

A latent edit vector is determined for each layer of the multiple layers based on the text prompt (block 808). By way of example, the image transformation system 116 determines latent edit vectors 214 for each layer of the generator network 124 based on the text prompt 120. In one or more implementations, the image transformation system 116 employs the global direction module 216 to determine the latent edit vectors 214. Alternatively, the image transformation system 116 employs the latent mapper module 218 to determine the latent edit vectors 214.

An edited feature is output by each layer of the multiple layers based on the latent edit vector (block 810). By way of example, the image transformation system 116 combines the latent edit vectors 214 with the transformed latent vector 208 to produce a combined latent vector 220 for each layer of the generator network 124. The combined latent vectors 220 are provided to corresponding layers of the generator network 124 via the layer specific affine operations 210. In this way, the edited latent style vectors 224 are provided to the corresponding layers 202 of the generator network 124. Further, each respective layer 202 outputs an edited feature 230 conditioned on the edited latent style vector 224 associated with the respective layer 202 and the previous blended feature 234. The edited feature 230 output by a respective layer 202 incorporates the blended features 226 output by the blending module 232 at previous layers 202, and edits the set of attributes in the input image 118 that the respective layer 202 controls based on the text prompt 120.

A blended feature is computed for each layer of the multiple layers by blending the unedited feature and the edited feature based on the mask (block 812). For example, the blending module 232, for each respective layer 202, blends the unedited feature 228 and the edited feature output by the respective layer 202 based on the mask 236 generated for the respective layer 202. In particular, the blended feature 226 of a respective layer 202 includes the edited feature 230 in the local edit region and the unedited feature 228 outside the local edit region. Thus, in scenarios in which the mask 236 generated for a respective layer 202 is a zero mask (e.g., does not identify a local edit region), the blended feature 226 for the respective layer 202 is the unedited feature 228.

An edited image is generated that incorporates the blended features computed for each layer of the generator network (block 814). By way of example, the image transformation system 116 renders a blended feature 226 output by the blending module 232 at a final layer 202 of the generator network 124 in a color space (e.g., the RGB color space) to generate the edited image 122. Since the unedited feature 228 and the edited feature 230 output by each layer 202 are conditioned on the previous blended feature 234, the blended feature 226 output at the final layer 202 incorporates the blended features 226 output at previous layers 202 of the generator network 124.

In accordance with the described techniques, either the segment selection module 238 or the convolutional attention network 240 is employed to generate the masks 236. As compared to the segment selection module 238, the convolutional attention network 240 is employed to generate the edited image 122 having a decreased number of edits to undesirable portions of the edited image 122. This is because the convolutional attention network 240 is not confined to selecting predefined semantic segments as the local edit region. However, the segment selection module 238 is employed to generate the edited image 122 with increased computational speed because the confidence values of the matrix 320 are learned faster than the CNNs 402 of the convolutional attention network 240.

Further, either the global direction module 216 or the latent mapper module 218 is employed to determine the latent edit vectors 214. The latent mapper module 218 is employed to generate the edited image 122 having increased precision in reflecting the text prompt 120 accurately, particularly when the text prompt 120 affects multiple attributes of the input image 118. However, the global direction module 216 is employed to generate the edited image 122 with increased computational speed because the latent edit vectors 214 of the global direction module 216 are learned faster than the machine learning mapper models 608, 610, 612.

Given this, in scenarios in which edit fidelity and quality is a significant factor in generating the edited image 122, a user of the image transformation system 116 employs the convolutional attention network 240 and/or the latent mapper module 218 to generate the edited image 122. Further, in scenarios in which computational speed is a significant factor, a user of the image transformation system 116 employs the segment selection module 238 and/or the global direction module 216. Notably, in implementations in which the segment selection module 238 and/or the global direction module 216 is employed, training time is significantly decreased in comparison to conventional techniques.

Example System and Device

Figure 9:
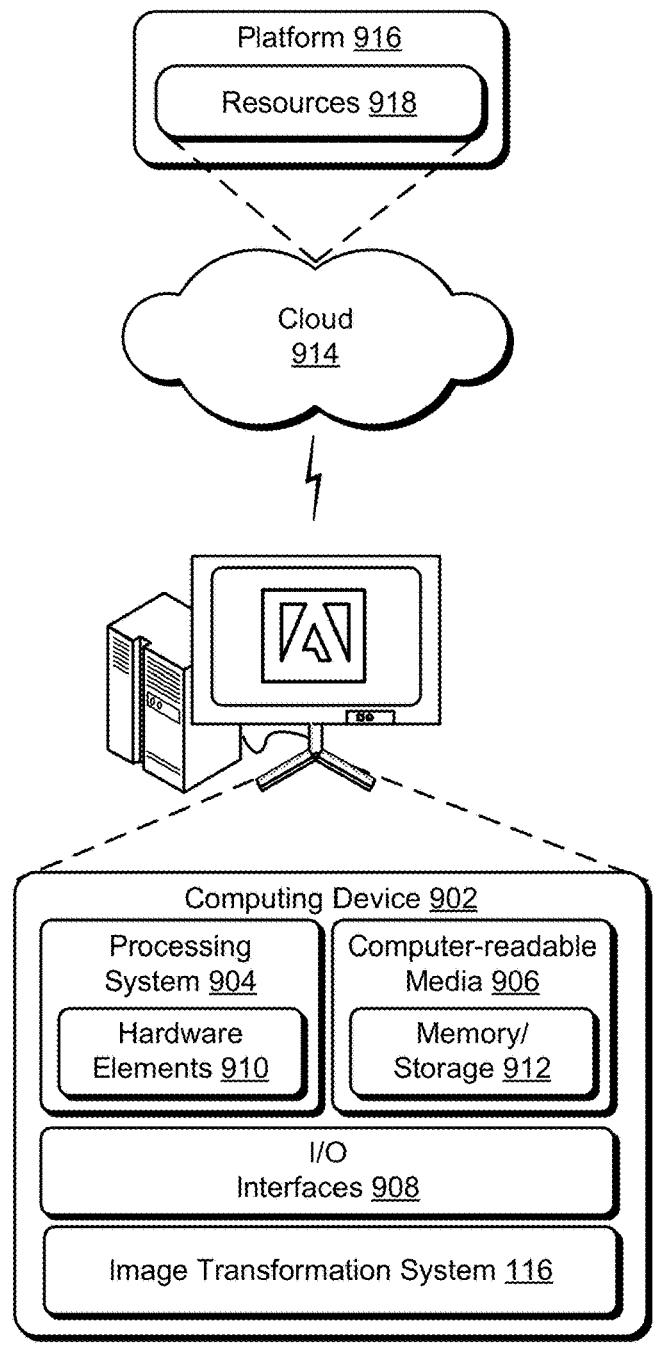
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that implement the various techniques described herein. This is illustrated through inclusion of the image transformation system 116. The computing device 902 is configurable, for example, as a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that is configurable as processors, functional blocks, and so forth. This includes implementation in hardware as an application specific integrated circuit or other logic device formed using one or more semiconductors. The hardware elements 910 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 906 is illustrated as including memory/storage 912. The memory/storage 912 represents memory/storage capacity associated with one or more computer-readable media. The memory/storage 912 includes volatile media (such as random access memory (RAM)) and/or nonvolatile media (such as read only memory (ROM), Flash memory, optical disks, magnetic disks, and so forth). The memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employed to implement various techniques described herein. Accordingly, software, hardware, or executable modules are implemented as one or more instructions and/or logic embodied on some form of computer-readable storage media and/or by one or more hardware elements 910. The computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing system 904. The instructions and/or functions are executable/operable by one or more articles of manufacture (for example, one or more computing devices 902 and/or processing systems 904) to implement techniques, modules, and examples described herein.

The techniques described herein are supported by various configurations of the computing device 902 and are not limited to the specific examples of the techniques described herein. This functionality is also implementable all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 include applications and/or data that can be utilized while computer processing is executed on servers that are remote from the computing device 902. Resources 918 can also include services provided over the Internet and/or through a subscriber network, such as a cellular or Wi-Fi network.

The platform 916 abstracts resources and functions to connect the computing device 902 with other computing devices. The platform 916 also serves to abstract scaling of resources to provide a corresponding level of scale to encountered demand for the resources 918 that are implemented via the platform 916. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

What is claimed is:

1. A method, comprising:
   receiving, by a processing device, a text prompt and an input image by a generator network, the generator network including a plurality of layers configured to perform respective edits for the text prompt at different resolutions;
   generating, by the processing device, a plurality of masks defining local edit regions, respectively, of the input image for respective layers of the plurality of layers, the plurality of masks based on the text prompt;
   generating, by the processing device using the generator network, an edited image by editing the input image based on the plurality of masks, the respective edits of the respective layers, and the text prompt; and
   outputting, by the processing device, the edited image.

2. The method of claim 1, wherein the generating the plurality of masks includes segmenting, using a segmentation network, the input image into multiple semantic segments that each identify a different portion of a subject depicted in the input image.

3. The method of claim 2, wherein the generating the plurality of masks includes generating a matrix having columns that represent different layers of the generator network, rows that represent different semantic segments of the multiple semantic segments, and entries populated with confidence values indicating degrees of likelihood that the respective layers affect corresponding semantic segments based on the text prompt.

4. The method of claim 3, wherein the generating the plurality of masks includes selecting, as the local edit regions for the respective layers, one or more semantic segments having confidence values in respective columns of the matrix that exceed a threshold.

5. The method of claim 1, wherein the generating the plurality of masks is performed using convolutional neural networks associated with the respective layers, the generating the plurality of masks further including conditioning the convolutional neural networks on the text prompt and unedited features output by the respective layers.

6. The method of claim 1, wherein the generating the edited image includes:
   determining latent edit vectors for the respective layers based on the text prompt;
   generating combined latent vectors for the respective layers by combining the latent edit vectors with a latent vector that defines the input image; and
   editing, by the respective layers, the input image based on the combined latent vectors.

7. The method of claim 6, wherein the generating the edited image includes:
   outputting, by the plurality of layers, unedited features based on the latent vector;
   outputting, by the plurality of layers, edited features based on respective combined latent vectors of the combined latent vectors; and
   generating blended features for the plurality of layers by blending the edited features and the unedited features based on the plurality of masks, the blended features including respective edited features in the local edit regions and respective unedited features outside the local edit regions, the edited image incorporating the blended features.

8. The method of claim 7, wherein the outputting the unedited features and the outputting the edited features includes conditioning the plurality of layers on the blended features output by previous layers of the generator network.

9. The method of claim 7, wherein one or more masks generated for one or more layers are zero masks indicating that the one or more layers do not affect the input image based on the text prompt, and the blended features generated for the one or more layers are the unedited features output by the one or more layers.

10. The method of claim 6, wherein the determining the latent edit vectors includes determining, using one or more machine learning mapper models, the latent edit vectors based on the text prompt and the latent vector, the latent edit vectors being dependent on the input image.

11. The method of claim 6, wherein the determining the latent edit vectors includes determining a global direction for the latent edit vectors, the latent edit vectors being independent of the input image.

12. The method of claim 6, wherein the generating the plurality of masks and the determining the latent edit vectors is performed using one or more machine learning models.

13. The method of claim 12, further comprising:
   generating an additional edited image by editing the input image based on the respective edits of the plurality of layers and the text prompt without using the plurality of masks;
   determining, using a contrastive language-image pre-training model, a first measure of similarity between the edited image and the text prompt and a second measure of similarity between the additional edited image and the text prompt; and training the one or more machine learning models based on the first and second measures of similarity.

14. The method of claim 12, further comprising training the one or more machine learning models based on squared Euclidean norms of the latent edit vectors and a size of the local edit regions in the plurality of masks.

15. A system, comprising:

a processing device; and a computer-readable media storing instructions that, responsive to execution by the processing device, cause the processing device to perform operations including:

receiving a text prompt and an input image by a generator network, the generator network including a plurality of layers configured to perform respective edits for the text prompt at different resolutions;

generating, for a layer of the plurality of layers, a mask defining a local edit region of the input image based on the text prompt;

generating a feature of an edited image by editing, using the layer, the input image based on the text prompt and the mask; and generating the edited image by incorporating the feature into the edited image.

16. The system of claim 15, wherein generating the mask includes:

segmenting the input image into semantic segments as part of processing the text prompt; and selecting at least one semantic segment as the local edit region based on the text prompt and the respective edits of the layer.

17. The system of claim 16, wherein the generating the mask includes generating a matrix having columns that represent different layers of the generator network, rows that represent different semantic segments, and entries populated with confidence values indicating degrees of likelihood that respective layers affect corresponding semantic segments based on the text prompt and the respective edits of the respective layers.

18. The system of claim 17, wherein the selecting the at least one semantic segment includes selecting at least one entry from among the entries in a column associated with the layer, the at least one semantic segment having a confidence value that exceeds a threshold.

19. A non-transitory computer-readable medium storing executable instructions, which when executed by a processing device, cause the processing device to perform operations comprising:

receiving a text prompt and an input image by a generator network, the generator network including a plurality of layers configured to perform respective edits for the text prompt at different resolution;

generating, for a layer of the plurality of layers, a mask defining a local edit region of the input image by conditioning a convolutional neural network associated with the layer on the text prompt and an unedited feature output using the layer;

generating a feature of an edited image by editing, using the layer, the input image based on the text prompt and the mask; and generating the edited image by incorporating the feature into the edited image.

20. The non-transitory computer-readable medium of claim 19, wherein the generating the feature includes:

generating, using the layer, an unedited feature based on a latent vector that defines the input image;

determining a latent edit vector for the layer based on the text prompt;

generating a combined latent vector by combining the latent vector and the latent edit vector;

generating, using the layer, an edited feature based on the combined latent vector; and generating the feature by blending the unedited feature and the edited feature based on the mask.

* * * * *